United States Patent
Abdo et al.

(10) Patent No.: US 11,579,128 B2
(45) Date of Patent: Feb. 14, 2023

(54) ACTIVATABLE TEMPERATURE INDICATOR WITH TIME DELAY

(71) Applicant: Temptime Corporation, Morris Plains, NJ (US)

(72) Inventors: Mohannad Abdo, Clifton, NJ (US); John Newport, Chadds Ford, PA (US); John Olson, Dayton, NJ (US); Brian Huffman, Belle Mead, NJ (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 873 days.

(21) Appl. No.: 16/409,082

(22) Filed: May 10, 2019

(65) Prior Publication Data
US 2019/0346415 A1    Nov. 14, 2019

Related U.S. Application Data

(60) Provisional application No. 62/670,494, filed on May 11, 2018.

(51) Int. Cl.
*G01N 31/22* (2006.01)
*G01K 1/02* (2021.01)

(52) U.S. Cl.
CPC ............. *G01N 31/229* (2013.01); *G01K 1/02* (2013.01)

(58) Field of Classification Search
CPC ........ G01N 31/229; G01K 1/02; G01K 11/06; G01K 3/04
See application file for complete search history.

(56) References Cited

U.S. PATENT DOCUMENTS

| 3,065,083 | A | | 11/1962 | Gessler |
| 3,615,719 | A | * | 10/1971 | Michel ..................... A23B 4/06 374/E11.006 |
| 3,768,976 | A | * | 10/1973 | Hu ......................... G09F 3/0291 422/402 |
| 4,050,945 | A | | 9/1977 | Suzuki |
| | | | (Continued) | |

FOREIGN PATENT DOCUMENTS

WO    2005/075978    8/2005

OTHER PUBLICATIONS

O'Leary et al., "Copolymers of poly(n-alkyl acrylates): synthesis, characterization, and monomer reactivity ratios," Polymer, 45:6575 (2004).

(Continued)

*Primary Examiner* — Nimeshkumar D Patel
*Assistant Examiner* — Tania Courson
(74) *Attorney, Agent, or Firm* — K&L Gates LLP

(57) ABSTRACT

Disclosed herein are delayed reaction threshold temperature indicators and methods of making and activating the same, the delayed reaction threshold temperature indicators including a first substrate, first and second layers, and a housing secured to the substrate. The first layer includes a first reactant and an optional meltable polymer, and the second layer includes a meltable polymer and a second reactant. The meltable polymer is configured to keep the first and second reactants from interacting with each other. When exposed to temperatures at and/or above a desired threshold for a period of time, the meltable polymer melts and allows the first and second reactants to come into contact with each other, thereby producing a visual change in appearance.

23 Claims, 7 Drawing Sheets

(56) References Cited

U.S. PATENT DOCUMENTS

| | | | | |
|---|---|---|---|---|
| 4,717,710 | A * | 1/1988 | Shimizu | D06P 1/0096 |
| | | | | 106/311 |
| 4,931,420 | A | 6/1990 | Asano et al. | |
| 6,042,264 | A * | 3/2000 | Prusik | G01K 3/04 |
| | | | | 374/150 |
| 6,544,925 | B1 | 4/2003 | Prusik et al. | |
| 6,602,594 | B2 | 8/2003 | Miyata et al. | |
| 6,741,523 | B1 * | 5/2004 | Bommarito | G01K 3/04 |
| | | | | 374/102 |
| 7,232,253 | B2 * | 6/2007 | Isbitsky | G01K 3/04 |
| | | | | 374/102 |
| 7,517,146 | B2 * | 4/2009 | Smith | G01K 11/06 |
| | | | | 374/102 |
| 7,682,830 | B2 * | 3/2010 | Prusik | G01N 31/229 |
| | | | | 374/162 |
| 7,770,534 | B2 * | 8/2010 | Cooperman | G01K 3/005 |
| | | | | 374/106 |
| 7,891,310 | B2 * | 2/2011 | Taylor | G01K 11/06 |
| | | | | 374/106 |
| 7,940,605 | B2 | 5/2011 | Rel et al. | |
| 8,061,294 | B2 * | 11/2011 | Suda | G01K 11/06 |
| | | | | 374/106 |
| 8,562,208 | B2 | 10/2013 | Yeager et al. | |
| 8,701,587 | B2 * | 4/2014 | Park | G01K 11/06 |
| | | | | 374/102 |
| 8,707,887 | B2 * | 4/2014 | Suda | G01K 11/06 |
| | | | | 374/162 |
| 9,127,990 | B2 * | 9/2015 | Rabinowitz | G01K 11/06 |
| 9,182,292 | B2 | 11/2015 | Rel et al. | |
| 9,234,806 | B2 | 1/2016 | Hoon et al. | |
| 9,310,258 | B2 * | 4/2016 | Selman | G01K 3/04 |
| 9,348,318 | B2 * | 5/2016 | Hong | G04F 1/06 |
| 9,404,808 | B2 * | 8/2016 | Park | A61L 2/28 |
| 9,410,852 | B2 * | 8/2016 | Park | G01K 11/06 |
| 9,448,182 | B2 | 9/2016 | Haarer et al. | |
| 9,546,911 | B2 * | 1/2017 | Huffman | G01K 1/02 |
| 10,451,595 | B2 * | 10/2019 | Patel | G07C 1/00 |
| 10,514,340 | B2 * | 12/2019 | Prusik | G01K 3/04 |
| 11,241,902 | B1 * | 2/2022 | Smith | B42D 25/373 |
| 2004/0240324 | A1 * | 12/2004 | Isbitsky | G01K 3/04 |
| | | | | 368/327 |
| 2008/0110391 | A1 * | 5/2008 | Taylor | G01K 3/04 |
| | | | | 374/E11.006 |
| 2013/0220209 | A1 * | 8/2013 | Rabinowitz | G01K 11/06 |
| | | | | 116/216 |
| 2013/0239874 | A1 * | 9/2013 | Smith | G01N 31/229 |
| | | | | 156/60 |
| 2013/0305980 | A1 * | 11/2013 | Park | G01K 11/12 |
| | | | | 493/379 |
| 2014/0044609 | A1 | 2/2014 | Prusik et al. | |
| 2014/0119402 | A1 | 5/2014 | Zongwu et al. | |
| 2018/0372549 | A1 * | 12/2018 | Kwon | G01K 11/16 |

OTHER PUBLICATIONS

Greenberg et al., "Side Chain Crystallization of n-Alkyl Polymethacrylates and Polyacrylates," J. Am. Chem. Soc., 76 (24):6280 (1954).

Search Report and Written Opinion dated Jul. 25, 2019 issued for International PCT Application No. PCT/US19/31766.

* cited by examiner

FIG. 4
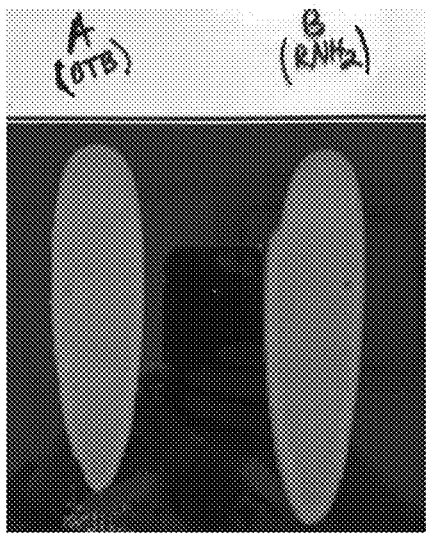
FIG. 5
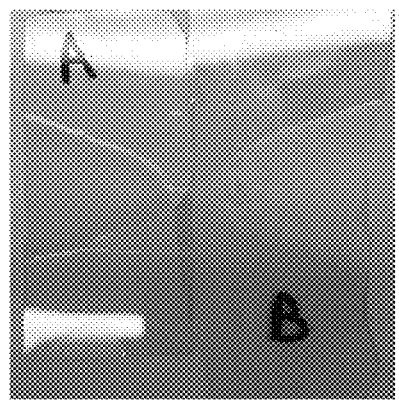
FIG. 6
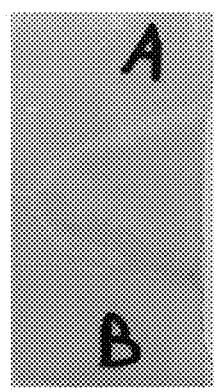
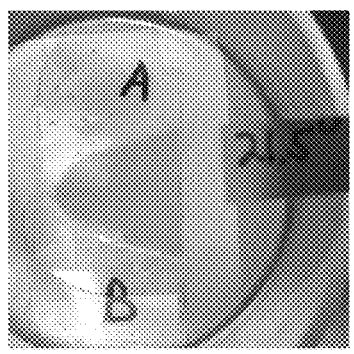
FIG. 7
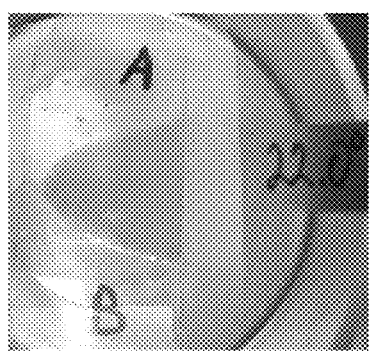
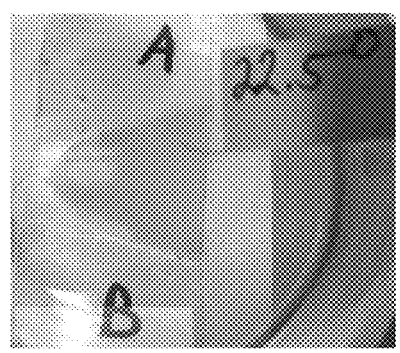
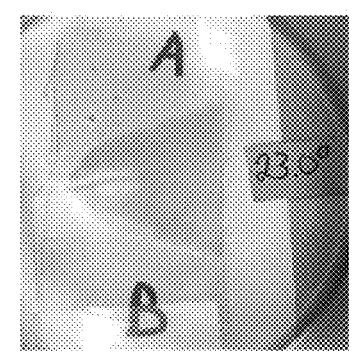
FIG. 8   FIG. 9   FIG. 10

ACTIVATABLE TEMPERATURE INDICATOR WITH TIME DELAY

CROSS REFERENCE TO RELATED APPLICATIONS

The present application claims the benefit of U.S. Provisional Patent Application No. 62/670,494, filed May 11, 2018, the entire content of which is hereby incorporated by reference in its entirety.

BACKGROUND

Many vaccines, drugs, foodstuffs and other products are temperature-sensitive, or perishable, and can lose quality with time at rates that are influenced by ambient temperatures. Time-temperature indicators are known which can provide a simple visual indication of the cumulative historical exposure of a host product to heat or exposure to a peak temperature for even a short period of time. The visual indication can be used to provide a signal of when a product may have lost quality or freshness.

Known time-temperature indicators can provide a color change at a predetermined threshold or end point to indicate possible loss of quality or freshness of the host product. The color change can be displayed in a suitable label, or the like, to be read optically, for example, visually by a human viewer. The color change can be chromatic or achromatic or provided by another visually detectable optical parameter change. The temperature-response parameters of the time-temperature indicator can be correlated with a deterioration characteristic of the host product to coordinate the color change appropriately with the likely condition of the host product.

Also, certain perishable products, for example, vaccines and sensitive medications as well as some foodstuffs and other products including some industrial products can have their quality or safety compromised by relatively brief exposures to a temperature in excess of a predetermined threshold.

Some known time-temperature and threshold indicators employ dye-sublimation technology (U.S. Publication No. 2014/0119402), metal etching (U.S. Pat. No. 9,448,182), gel-based technology (U.S. Pat. Nos. 7,940,605, 8,562,208, and 9,182,292), spiropyrans and UV energy (International Publication No. WO 2005/075978), meltable granules (U.S. Pat. No. 6,602,594), and linear diffusion (U.S. Pat. No. 9,234,806).

Notwithstanding the foregoing proposals for cumulative and threshold temperature indicators, it would be desirable to have a relatively simple threshold indicator having enhanced response characteristics, such as a delayed response, a simple method of manufacture, and a minimal space requirement.

SUMMARY

Disclosed herein are delayed reaction threshold temperature indicators and methods of making and activating the same. According to some embodiments, a delayed reaction threshold temperature indicator includes a first substrate, first and second layers, and a housing secured to the substrate. The first layer includes a first reactant and an optional meltable polymer, and the second layer includes a meltable polymer and a second reactant. The meltable polymer of the second layer and (where applicable) the meltable polymer of the first layer are configured to keep the first and second reactants from interacting with each other. Moreover, the meltable polymer is selected and configured to melt at and/or above a threshold temperature and after exposure to that temperature for a period of time. Melting of the meltable polymer allows the first and second reactants to come into contact with each other, thereby producing a visual indication or visual change in appearance (e.g., a color-forming reaction) that the indicator has been exposed to a temperature at and/or above a desired threshold temperature for at least as long as the predetermined period of time. The housing can include a viewing window to allow for easy visualization of the visual indication.

In some embodiments, the housing fully encloses or envelopes the first substrate and the first and second layers. This can be achieved by providing a top and a bottom layer that are sealed or secured to each other on a periphery or edge. In some embodiments, the housing fully encloses only the first and second layers. This can be achieved by providing a top layer that is secured to the first substrate such that the first and second layers are sealed or contained between the housing and the first substrate.

Some embodiments include a reference area around or adjacent to the viewing window in the housing. The reference area may be printed onto the housing, or the reference area may consist of an additional layer or substrate that is adhered to an outer or an inner surface the housing. In some embodiments, the material comprising the housing is configured to function as the reference area by being opaque, colored, or patterned while the portion of the housing serving as the viewing window is maintained clear or translucent.

In some embodiments, the visual change in appearance is a change in color, which can be a darkening of the first and second layers visible through the viewing window, a lightening of the first and second layers visible through the viewing window, or a change to a different hue of the initial color.

In some embodiments, the first layer includes a second substrate infused, impregnated, or otherwise containing the first reactant. In some embodiments, the first layer includes a meltable polymer that contains the first reactant. In some embodiment, the first substrate contains the first reactant such that the first layer and the first substrate are the same. The first and/or second substrates can include a background comprising a pattern, an indicia, or a color darker than an initial color of the first and second reactants prior to their contacting each other. Such a background may be initially visible through the viewing window and at least partially obscured by the observable reaction between the first and second reactants.

In some embodiments, the meltable polymer of the second layer and the optional meltable material of the first layer are the same meltable polymer. In some embodiments, different meltable polymers are used. The meltable polymer of the second layer and, independently, of the first layer, when present, can have a melting point of from about −10° C. to about 50° C., from about −5° C. to about 40° C., from about 0° C. to about 30° C., from about 10° C. to about 25° C., or from about 15° C. to about 25° C. In some embodiments, the melting point of the meltable polymer is about 0° C., about 5° C., about 10° C., about 15° C., about 20° C., about 25° C., about 30° C., or about 40° C.

According to some embodiments, the period of time required before a visual change in appearance is achieved or observed is from about 5 minutes to about 60 minutes, from about 10 minutes to about 50 minutes, from about 15 minutes to about 40 minutes, or from about 20 minutes to about 30 minutes. In some embodiments, the period of time is at least about 10 minutes, at least about 15 minutes, at least about 20 minutes, at least about 25 minutes, at least about 30 minutes, at least about 35 minutes, at least about 40 minutes, or at least about 45 minutes. The period of time may occur during a single exposure to a temperature at and/or above the melting point of the meltable polymer, or the period of time may occur during two or more exposures to a temperature at and/or above the melting point of the meltable polymer. In some embodiments, the meltable polymer resolidifies rapidly when exposed to a temperature below the melting point of the meltable polymer. Resolidification may include recrystallization, and resolidification may inhibit migration of the first and/or second reactants through the first and/or second layers.

According to some embodiments, the molecular weight of the meltable polymer is from about 1,000 Da to about 400,000 Da, from about 2,000 Da to about 300,000 Da, from about 3,000 Da to about 200,000 Da, from about 5,000 Da to about 30,000 Da, or from about 8,000 Da to about 24,000 Da.

In some embodiments, the first reactant is bromothymol blue or resorcinol, and the first reactant can have a weight percent in the first layer that is about 0.1 to about 10%, about 0.2% to about 5%, about 0.5% to about 3%, or about 1% to about 2%. In some embodiments, the weight percent is about 0.5%, about 0.7%, about 1%, about 1.2%, about 1.5%, about 2%, or about 4%.

In some embodiments, the second reactant is butylamine or 5-(hydroxymethyl)furfural (HMF), and the second reactant can have a weight percent in the second layer that is about 0.5% to about 20%, about 1% to about 15%, about 1.5% to about 10%, or about 2% to about 5%. In some embodiments, the weight percent of the second reactant in the second layer is about 1%, about 1.5%, about 2%, about 2.5%, about 3%, about 4%, or about 5%.

According to some embodiments, the amount of the second reactant exceeds the amount of the first reactant on a molar basis or on a weight basis or on a volume basis. In some embodiments, the amount of the second reactant is sufficient to react with substantially all of the first reactant or sufficient to react with at least about 60%, at least about 65%, at least about 70%, at least about 75%, at least about 80%, at least about 85%, at least about 90%, or at least about 95% of the first reactant. In some embodiments, the weight ratio or molar ratio of the first reactant to the second reactant is at least about 1:1, at least about 1:1.2, at least about 1:1.4, at least about 1:1.5, at least about 1:1.6, at least about 1:1.8, or at least about 1:2.

Some embodiments further include a barrier layer between the first and second layers. The optional barrier layer can be permeable to at least one of the meltable polymer, the first reactant, and the second reactant when the meltable polymer is at least partially liquid or at least partially amorphous. In some embodiments, the barrier layer includes a meltable material that can be the same as or different from the meltable material used in the first and/or second layers.

Also disclosed herein are combination indicators that include a delayed reaction threshold temperature indicator as discussed herein used in combination with at least one of a freeze indicator, a second threshold indicator, and a cumulative indicator. The second threshold indicator can be configured to monitor at least one of a change in or a period of exposure to temperature, pH, humidity, or radiation.

According to some embodiments, the indicators and/or combination indicators discussed herein are affixed to a product, a container, or a product packaging, such as the primary packaging. The product, container, or product packaging may contain a perishable substance, such as a food product or a pharmaceutical product, such as a vaccine or a medicine.

According to some embodiments, a method of activating the indicators and combination indicators discussed herein includes applying the first layer to a first face of the substrate so that the first layer is adhered to the substrate, applying the second layer to a first face of the housing so that the second layer is adhered to the housing, and affixing the housing to the substrate so as to bring the first layer into contact with the second layer. In some embodiments that include a barrier layer between the first and second layers, a method of activating such an indicator includes applying the first layer to a first face of the substrate so that the first layer is adhered to the substrate, applying the barrier layer to the first layer, applying the second layer to a first face of the housing so that the second layer is adhered to the housing, and affixing the housing to the substrate so as to bring the first layer into contact with the barrier layer. Some embodiments further include removing the optional barrier layer after affixing the housing to the substrate so as to allow the first meltable polymer layer to come into contact with the second meltable polymer layer. Some embodiments further include applying pressure to the housing so as to bring the second meltable polymer layer into contact with the first meltable polymer layer, which may be necessary or desirable if removal of the barrier layer leaves a space or partial gap between the first and second layers.

According to some embodiments, a method of making a delayed reaction threshold temperature indicator includes applying a first mixture to a first substrate to create a first indicator element, the first mixture including a first reactant; applying a second mixture to a second substrate to create a second indicator element, the second mixture including a meltable polymer and a second reactant; and securing the first and second indicator elements to each other so that at least part of the second mixture is brought into contact with the first mixture and so that first and second mixtures are enclosed by the first and second substrates. Melting of the meltable polymer allows the first and second reactants to contact each other to produce a visual change in appearance. In some embodiments, the first mixture further includes a meltable polymer.

These and other features are disclosed in greater detail in the accompanying figures and the Detailed Description below.

BRIEF DESCRIPTION OF THE DRAWINGS

FIG. 4 illustrates one embodiment of two indicator components prior to being assembled as a threshold indicator.

FIG. 5 illustrates the indicator components of FIG. 3 being prepared for assembly.

FIG. 6 illustrates the indicator components of FIG. 3 secured together in a sandwich configuration.

FIGS. 7-16 illustrate the visual change that occurs as the threshold indicator of FIG. 6 is exposed to a steadily increasing temperature.

DETAILED DESCRIPTION

Figure 1:
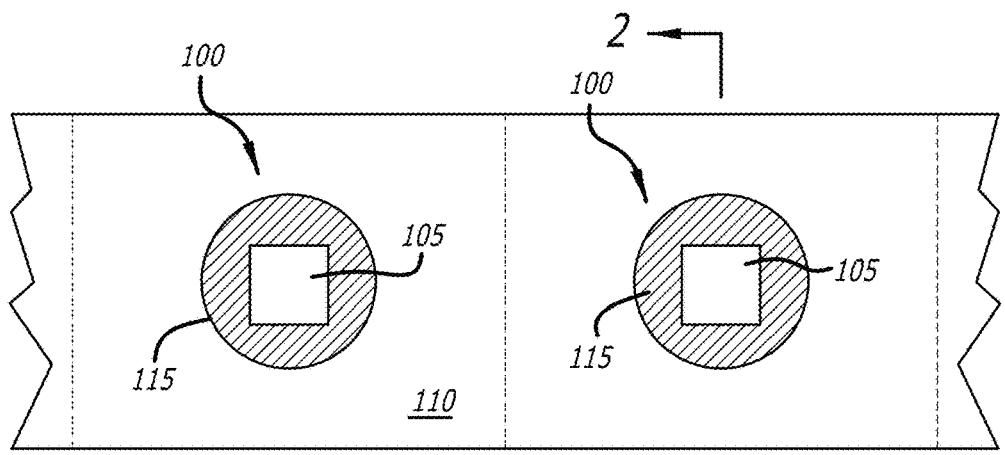
FIG. 1 is a plan view of two example threshold temperature indicators, according to an example embodiment of the present disclosure arranged side-by-side on a support liner.

To overcome one or more of the drawbacks of known threshold indicators, the present disclosure discusses optionally activatable threshold indicators intended to be associated with a host product to monitor the historical exposure of the host product to ambient temperatures.

The threshold indicators discussed herein generally utilize a meltable material containing one or more first reactive components, such that when the material melts in response to a temperature at and/or above the melting point of the material, the one or more reactive components is able to migrate or diffuse through the meltable solid and react with one or more other reactive components that are initially contained in a separate layer. The separate layer may itself be a layer of a meltable material, or the separate layer may be a substrate infused or coated with the one or more second reactive components. The distinct layers can be secured together during the manufacture and assembly of the indicators, a barrier layer can be inserted between the layers during assembly, or a user may assemble or secure the layers to each other after manufacture. When the components migrate through the meltable material layer(s), they interact with each other so as to produce a visually observable change in appearance, such as a change in color.

The migration of the components through the meltable material layer(s) until they interact with each other advantageously delays the response of the indicator to an ascending threshold temperature excursion such that the indicator only signals after exposure to a temperature above a threshold temperature for a specified time period.

The term "visual change in appearance" can mean a change in color, hue, a change from a darker to a lighter appearance, or a change from a lighter to a darker appearance. The term "color" is used herein to include achromatic visual appearances such as black, gray, and white, as well as primary, secondary, and other color hues, such as, without limitation, red, yellow, green, blue, purple, orange, brown, and other hues.

One objective of the present disclosure is to develop an indicator that will respond to an ascending threshold temperature excursion only after the indicator (and by implication a host product) has been exposed to a temperature above a threshold temperature for a specified time period. In some embodiments, such an indicator is not bulky in either the lateral or the vertical direction. In other words, the indicator can be manufactured as a "dot" label that is flexible (to conform to curved surface and is suitable for high-speed label application) and unobtrusive (e.g., with dimensions of, for example, about 10 mm in diameter).

The threshold indicators discussed herein and contemplated by the authors of this disclosure utilize a meltable material that can be configured to react to a threshold temperature relatively quickly. This is because the meltable material of some embodiments is configured or selected to have a sharp melting point meaning that the transition from solid to liquid happens very quickly over a small temperature range. Thus, exposure to a threshold or peak temperature exceeding the melting point of the meltable material causes a quick transformation. However, notwithstanding a relatively quick response by the meltable material to heat, some indicators discussed herein exhibit a time-dependent response that halts below the threshold temperature and resumes again in an additive way. Again, in some embodiments, this is due to the meltable material having a sharp transition between solid and liquid or liquid and solid.

In other words, where an indicator is configured to signal a response after an exposure of about 30 minutes at and/or above the threshold temperature, a 20-minute exposure will not trigger a response, but if the indicator is again exposed to a temperature at and/or above the threshold temperature, only ten more minutes of exposure will result in a visual response. In some embodiments as noted above, this behavior is achieved because the meltable solid (such as a side-chain crystalline polymer) crystallizes extensively and within a narrow temperature range. Once the threshold temperature has been exceeded, a drop in temperature below the threshold will cause immediate cessation of the time-dependent response. The response will resume once the threshold temperature is again exceeded.

As used herein, the terms "threshold" and "threshold temperature" have their normal meaning in the art and include a temperature, usually a temperature above 0° C. (though temperatures below 0° C. are also contemplated), that can cause damage or harm to a product, such as a food or a vaccine that may require refrigeration to avoid spoilage or maintain efficacy for extended periods. The term "threshold temperature," then, can include any predetermined temperature that is above a desired storage temperature of a perishable product, though in some cases exposure for short periods of time may not damage or harm a particular product. Thus, some embodiments disclosed herein are configured to provide signal of exposure to temperatures at and/or above a threshold temperature only after a specified amount of time even if exposure occurs at different times.

Some embodiments discussed here utilize two or more compounds capable of reacting with each other to result in a color change. The two or more reactants are separated by a layer of meltable material that presents a significant barrier to migration when the meltable material is in its solid form. The meltable material presents a much less significant (and controllable) barrier to migration in its molten form. An indicator can be assembled in such a way as to prevent contact between the reactive compounds during the manufacturing process. In some embodiments, the indicator components are kept below the melting temperature of the meltable material so that the barrier layer remains solid and there is insignificant or no color change. This renders the indicator momentarily unresponsive. When the indicator is heated above the melting temperature of the meltable material, the barrier becomes permeable and migration of the reactive compounds can begin. However, in some embodiments, there is a time delay before color change is observed. The indicator will show a response but only after a specific time delay that can be controlled by adjusting a number of parameters such as, among other features, choice of meltable solid, thickness of the meltable solid, molecular weight of the meltable solid, presence or absence of a barrier layer, barrier layer thickness, physical aspects of the barrier layer, choice of barrier material, reactant concentration, presence of catalysts, and choice of reactants.

A novel aspect of this approach is the use of a meltable material not only as the means to trigger response above a threshold temperature, but also to utilize the difference in barrier properties of the meltable material above and below its melting temperature to introduce a deliberate, controlled delay into the response time.

In some embodiments, it is necessary to prevent the reactive compounds from coming into contact with each other during the manufacturing process, and this issue can be overcome in various ways as discussed below.

Suitable meltable materials include synthetic polymeric materials that are solid below the threshold temperature and are, or can become, an amorphous solid or a viscous liquid when at and/or above a threshold temperature. Such synthetic polymeric materials are meltable. Useful synthetic polymers can also be hydrophobic, if desired. Suitable meltable materials include side-chain crystallizable polymers (e.g., poly(hexadecylmethacrylate)).

As used herein, the term "polymer", and its linguistic variations, refers to copolymers, and higher order polymers, as well as homopolymers, unless the context indicates otherwise, for example, by describing or referencing one or more specific homopolymers.

When solid, the synthetic polymeric material can be crystalline or partially crystalline. Crystalline or partially crystalline synthetic polymeric materials can have desirably sharp transitions from a solid state to a liquid state.

Side chain (liquid) crystalline polymers (abbreviated as SCC hereafter) are particularly suitable meltable materials, though other suitable materials such as waxes could readily be used. SCC polymers have a conventional polymer backbone and side chains that can co crystallize. Typically, they are chains that have six or more carbons with a crystallization temperature that is, therefore, adjustable. In some embodiments, the side chains "melt" independently of the main polymer chain so that the phenomenon can be used to release other materials that have been encapsulated within the overall polymer structure. Another advantage of SCC polymers is that their molecular weight and degree of crosslinking can be adjusted to control their physical properties including their permeability and in turn provide a means to tailor the time delay.

In some embodiments, the meltable solid has a "sharp" melting point, meaning that the transition from solid to liquid happens very quickly over a very small temperature range. In some embodiments, melting temperature and freezing temperature of the meltable solid are identical. In some embodiments, the melting and freezing temperatures are within about 0.1° C., within about 0.5° C., within about 1.0° C., within about 1.5° C., within about 2° C., within about 2.5° C., within about 3.0° C., within about 3.5° C., within about 4.0° C., within about 4.5° C., within about 5° C., or within about 10° C. of each other.

Some embodiments employ a two-layer design in which two layers are coated and dried separately and then laminated together in their dry form. In such a configuration, the inks may be of different types: they may both be solvent-based, both be aqueous, or one aqueous and the other solvent-based. It will be appreciated that the inks should be fully dried before being brought together. Preferably, this example utilizes a meltable solid that is inherently tacky (or has a tackifying agent added to it) so that at least one of the two layers is tacky in its dry form and will adhere smoothly to the other without air bubbles or other defects.

Some embodiments employ a modified two-layer design in which a barrier layer is placed between the two meltable layers. The barrier layer can be tacky and/or serve as an adhesive between the two meltable layers. In some embodiments, such a barrier layer melts along with the two meltable layers. The barrier layer may comprise the same material as one or both of the two meltable layers. In some embodiments, the barrier layer may be permeable to the color-forming reactants and/or the material comprising one or both of the two meltable layers.

Some embodiments employ a single layer design where a single layer of a meltable solid is secured to a substrate. One or more first reactive compounds is contained within the meltable solid layer, and one or more second reactive compounds is contained within or coated onto the substrate. When the meltable layer melts, the first components migrate toward the substrate to cause a color-forming reaction with the second components. In some embodiments, the melting of the meltable solid allows at least some of the second components to leave the substrate and migrate through the meltable solid.

Used in combination with the meltable material, in some embodiments, are color-reacting materials, such as two reactants kept separate by the meltable material below the threshold temperature but allowed to react with each other at and/or above the threshold temperature. Dyes can also be dissolved in such meltable materials to provide an intense color. In some embodiments, the color-reacting materials, or color-forming reactants, produce a distinct color change or change in opacity when brought into contact with each other.

When the reactants come into contact, the appearance change of the indicator may be to go from clear to black, from clear to a dark color, from a light color to a dark color, from a light color to black, etc. In some embodiments, a background is visible through the meltable layer(s) prior to the reaction, thereby indicating that the predetermined temperature threshold and required exposure period have not yet been satisfied. The background may include words, numbers, or a pattern, or may simply comprise a color that is easily obscured by the color-forming reaction of the reactants. In some embodiments, a pattern on the background is at least partially obscured by the light color of the meltable layer(s), and the pattern becomes more visible after the color-forming reaction. For example, if the pattern is formed with an ink having a color similar to the color of the pre-reacted reactants, a color change produced by the interaction of the color-forming reactants may render the pattern more visible.

One advantage of some embodiments discussed herein is a significant cost reduction over electronic indicators. Another advantage of some embodiments is that they can be smaller and more flexible than many prior art technologies because the meltable polymers can be readily dyed to achieve a strong color in relatively small quantities such that only a thin layer of the meltable polymer is required to achieve the desired visual response. Because only a small amount is required, thinner indicators can be fabricated as well as indicators having smaller diameters. Also, the designs discussed herein are as simple as a printed ink on label stock that may or may not include an overlaminate.

Meltable Materials

The meltable materials suitable for use in the threshold indicators discussed herein can have temperature-related viscosity characteristics providing appropriate rates of reaction between the two or more reactants at temperatures of interest above the threshold temperature. Specifically, the meltable material can have a temperature-related viscosity profile, or algorithm, which provides a temperature-dependent rate of transport of the two or more reactants within the meltable material at a temperature, or within a temperature range, which is useful for monitoring the intended host product. For example, the viscosity of the meltable material, above the threshold temperature, can decline with increasing temperature.

The meltable material can have a viscosity, or viscosity profile, at a particular temperature, or a temperature range, that provides a rate of transport within the material that is convenient for fine-tuning or customizing the response period for a given product whose viability or freshness may not be materially impacted by short periods of exposure to temperatures at or slightly above the threshold temperature. The time period can relate to the time from the manufacture of the host product to its end use, including a possible storage period, or periods, during distribution, or can be determined in another suitable manner. For example, in some embodiments, the viscosity is configured so that a cumulative exposure of 30 minutes at a temperature at and/or above the threshold temperature will allow the two or more reactants to produce a visual change in appearance. However, an exposure less than 30 minutes, for example 20 minutes, will not produce the same change in visual appearance. An additional 10 minutes, which may occur later, is required to achieve the same visual change in appearance.

The meltable material employed in some embodiments can have an average molecular weight of at least about 1,000 Da, at least about 3,000 Da, between about 8,000 Da and about 24,000 Da, or an average molecular weight of up to 200,000 Da. Synthetic polymeric materials suitable for use as the meltable material can have a molecular weight in a range of from about 1,000 Da to about 300,000 Da, or in a range of from about 1,500 Da to about 200,000 Da, or in a range of from about 5,000 Da to about 100,000 Da, or in a range of from about 5,000 Da to about 20,000 Da.

By way of further example, the synthetic polymeric material can have a molecular weight of at least about 1,000 Da, at least about 1,500 Da, at least about 2,000 Da, or at least about 5,000 Da. Alternatively, or in addition, the synthetic polymeric material can have a molecular weight that is not greater than about 50,000 Da, not greater than about 100,000 Da, or not greater than about 300,000 Da, if desired. Furthermore, the synthetic polymeric material can have a molecular weight that is in a range from any one of said lower molecular weight limits to any one of said higher molecular weight limits, if desired.

In general, a higher molecular weight synthetic polymeric material can have a higher viscosity when in the liquid state at a temperature near its melting point than the corresponding synthetic polymeric material with a lower molecular weight. Thus, the response parameters of a threshold indicator including a suitable synthetic polymeric material configured to allow two or more reactants to contact each other can be tuned, or adjusted, by varying the molecular weight of the synthetic polymeric material.

The synthetic polymeric material, or other meltable material, can have a melting temperature selected to be the same as, or close to, a threshold temperature or can have another suitable melting temperature. Thus, the synthetic polymeric material can have a melting temperature which is in or close to any one of the threshold temperature ranges described herein, for example, in a temperature range of from about 10° C. to about 60° C., or in another suitable temperature range.

As used herein, the term "melting temperature", or "melting point" refer to the temperature at which a material exhibits peak unit heat absorption per degree Celsius, as determined by differential scanning calorimetry. Above its melting temperature, the transport material can exhibit liquid properties and can move, for example, flow or diffuse.

The synthetic polymeric material, or other meltable material, can have a melt onset temperature selected to be the same as, or close to, a desired threshold temperature of an indicator according to the present disclosure, or can have another suitable melt onset temperature. Thus, the synthetic polymeric material, or other meltable material, can have a melt onset temperature which is in or close to any one of the threshold temperature ranges described herein, for example, in a temperature range of from about −5° C. to about 60° C., or in another suitable temperature range.

As used herein, the term "melt onset temperature" refers to the temperature at which the meltable material begins to exhibit an increase in unit heat absorption per degree Celsius, as determined by differential scanning calorimetry. Below its melt onset temperature, the meltable material can be solid.

As used herein, the term "melting temperature range" refers to the temperature range from the melt onset temperature to the melting temperature of a material.

At temperatures in the melting temperature range, the synthetic polymeric material can be softer than it is below the melt onset temperature and may or may not move perceptibly in a relevant time scale, depending upon the nature of the particular synthetic polymeric material. Some synthetic polymeric materials useful in the practice of the embodiments discussed herein can exhibit a low flow rate in the melting temperature range, which flow rate is so slow as to be immaterial for present purposes.

In some embodiments, the synthetic polymeric material, or other meltable material, can have a relatively narrow melting temperature range, for example, a melting temperature range of not more than about 30° C., a melting temperature range of not more than about 10° C., a melting temperature range of not more than about 5° C., a melting temperature range of not more than about 2° C., or a melting temperature range of from about 0° C. to about 30° C.

A synthetic polymeric material employed in the threshold indicators discussed herein can have any suitable chemistry that will enable the synthetic polymeric material to fulfill one or more of the objectives, or requirements, of the threshold indicators as described herein. For example the synthetic polymeric material can include a side chain crystallizable polymer.

Polymers that have ordered regions in the solid state, wherein their molecular chains are partially aligned, are described herein as "crystalline" polymers. Above their melting temperatures, such polymers are "crystallizable." The terms "crystalline" and "crystallizable" are used herein in relation to certain polymers with the understanding that the respective polymer can be "crystalline" below its melting temperature and "crystallizable" above. The term "crystalline" as used herein does not necessarily imply one hundred percent crystallinity, although one hundred percent crystallinity can be included, and also includes the concept of "semicrystalline." In other words, a "crystalline" or "crystallizable" polymer can be a polymer that includes a region that is crystalline or crystallizable and has another region that is not, or regions that are not, crystalline or crystallizable.

Crystallinity can be localized in particular regions of a given polymer or can be associated with particular chemical structural characteristics of the polymer. Various methods of measuring the degree of crystallinity of a polymer are known and include density measurement, differential scanning calorimetry (DSC), X-ray diffraction (XRD), infrared spectroscopy, and nuclear magnetic resonance (NMR). The measured value can vary according to the method used.

The properties of crystalline polymers can differ from those of amorphous polymers. For example, some crystalline polymers can resist softening above their glass transition temperatures, can be harder and more brittle than amorphous polymers, and can be opaque to visible light.

Side-chain crystallizability in a polymer useful in threshold indicators discussed herein can provide a relatively sharp transition from the solid state to the liquid state. A sharp transition can be useful in correlating the temperature response characteristics of the polymer with those of a host product to facilitate monitoring the temperature exposure of the host product. The polymer's melting range is usually indicative of the sharpness of the solid state to liquid state transition. Depending upon the properties of the intended host product, a relatively narrow melting range can be useful, for example, a melting range of about 10° C. or about 5° C. or about 2° C.

Some side-chain crystallizable polymers have temperature-related melting and viscosity properties that make them useful as meltable materials for use in the threshold indicators discussed herein. Thus, some useful side-chain crystallizable polymers have relatively low melting temperatures, for example, below about 60° C. Also, some side-chain crystallizable polymers, upon melting, transition from a soft solid which softens further as it melts, to a high-viscosity molten material that decreases in viscosity slowly as temperature increases.

Useful side-chain crystallizable polymers include polymers having regions of crystallizability, or the ability to form crystallites, in side chains of the polymer molecule. Some useful side-chain crystallizable polymers lack crystallinity in the backbone of the polymer molecule, but backbone crystallinity can be present in other cases.

Useful side-chain crystallizable polymers can have alkyl side chains, or the side chains can have another suitable chemical structure or structures. The backbone can be constituted of hydrocarbon groups or have can have another suitable chemical structure. Various substituent groups are possible. Some useful side-chain crystallizable polymers are described in more detail elsewhere herein.

The degree of crystallinity of suitable side-chain crystallizable polymers can be expressed in terms of a weight percent crystallinity. For example, the polymer can have a percent crystallinity, as determined by differential scanning calorimetry, that is selected from the group consisting of: from about 5 percent to about 85 percent by weight; from about 10 percent to about 55 percent by weight; and from about 20 percent to about 40 percent by weight; based on the weight of the polymer.

Some side-chain crystallizable polymers that have a higher degree of crystallinity when crystallized can allow for greater migration of reactants through them than polymers having a lower crystallinity. Accordingly, the rate of migration of a reactant through side-chain crystallizable polymer can be chosen, or adjusted, by employing a side-chain crystallizable polymer having a suitable crystallinity.

Some useful side-chain crystallizable polymers, alone or in combination, and methods that can be employed for preparing them, are described in O'Leary et al., *Copolymers of poly(n-alkyl acrylates): synthesis, characterization, and monomer reactivity ratios*, 45 POLYMER 6675 (2004) ("O'Leary et al." herein), and in Greenberg et al., *Side Chain Crystallization of n-Alkyl Polymethacrylates and Polyacrylates,* 76(24) J. AM. CHEM. SOC. 6280 (1954) ("Greenberg et al." herein). The disclosure of each of O'Leary et al. and Greenberg et al. is incorporated by reference herein for all purposes.

Polymers described in O'Leary et al. and Greenberg et al. include homopolymers of methacrylates, homopolymers of acrylates and various copolymers of methacrylates and acrylates. The described polymers also include polymers having n-alkyl groups with from 12 to 18 carbon atoms. Further, the polymers described in O'Leary et al. include various copolymers of poly(n-alkylacrylates).

Some polymers described in Greenberg et al. and O'Leary et al. that can be employed in threshold indicator embodiments herein are shown in Table 1 below. The various columns in Table 1, reading from left to right, show a chemical name for a side-chain crystallizable polymer, and the number of carbon atoms in the side chain of the monomer unit, if the polymer is a homopolymer, or in a first monomer unit if the polymer is a copolymer. The next column shows the proportion of the first monomer unit in the polymer in mole percent, the proportion being 100 for a homopolymer. Subsequent columns show the number of carbon atoms in the side chain of a second monomer unit, if the polymer is a copolymer, and the melting point of the polymer. The side chains are all straight-chain n-alkyl groups having the number of carbon atoms indicated in Table 1.

TABLE 1

| n-alkylpolymer | Monomer 1 Carbons | Monomer 1 Percent | Monomer 2 Carbons | Melting Point |
|---|---|---|---|---|
| Acrylic homopolymers | | | | |
| Poly(dodecylacrylate) | 12 | 100 | — | 2° C. |
| Poly(tetradecylacrylate) | 14 | 100 | — | 22° C. |
| Poly(hexadecylacrylate) | 16 | 100 | — | 33° C. |
| Poly(octadecylacrylate) | 18 | 100 | — | 42° C. |
| Acrylic copolymers | | | | |
| Copolymer of hexylacrylate and dodecylacrylate | 6 | 25 | 12 | 7.6° C. |
| Copolymer of hexylacrylate and dodecylacrylate (10 percent conversion of monomer) | 6 | 25 | 12 | −6.2° C. |
| Copolymer of hexylacrylate and docosylacrylate | 6 | 25 | 22 | 54.2° C. |
| | | 50 | | 48.7° C. |
| | | 75 | | 34.5° C. |
| Copolymer of decylacrylate and tetradecylacrylate | 10 | 50 | 14 | 3.7° C. |
| Copolymer of decylacrylate and octadecylacrylate | 10 | 25 | 18 | 42.4° C. |
| Copolymer of decylacrylate and octadecylacrylate | 10 | 50 | 18 | 31.1° C. |
| Copolymer of decylacrylate and octadecylacrylate | 10 | 75 | 18 | −1.1° C. |
| Copolymer of dodecylacrylate and docosylacrylate | 12 | 25 | 22 | 56.0° C. |
| Copolymer of dodecylacrylate and docosylacrylate | 12 | 50 | 22 | 45.9° C. |
| Copolymer of dodecylacrylate and docosylacrylate | 12 | 75 | 22 | 12.5° C. |
| Copolymer of tetradecylacrylate and | 14 | 25 | 18 | 41.9° C. |

TABLE 1-continued

| n-alkylpolymer | Monomer 1 Carbons | Monomer 1 Percent | Monomer 2 Carbons | Melting Point |
|---|---|---|---|---|
| octadecylacrylate | | | | |
| Copolymer of tetradecylacrylate and octadecylacrylate | 14 | 50 | 18 | 32.7° C. |
| Copolymer of tetradecylacrylate and octadecylacrylate | 14 | 75 | 18 | 25.7° C. |
| Methacrylic homopolymers | | | | |
| Poly(dodecylmethacrylate) | 12 | 100 | — | -34° C. |
| Poly(tetradecylmethacrylate) | 14 | 100 | — | -2° C. |
| Poly(hexadecylmethacrylate) | 16 | 100 | — | 20° C. |
| Poly(octadecylmethacrylate) | 18 | 100 | — | 34° C. |
| Methacrylic copolymers | | | | |
| Copolymer of tetradecylmethacrylate and methyl methacrylate | 14 | 50 | 1 | 0° C. |
| Copolymer of octadecylmethacrylate and methyl methacrylate | 18 | 50 | 1 | 30° C. |
| | | 59.5 | | 32° C. |
| | | 69.5 | | 28° C. |

The data in Table 1 illustrate that numerous side-chain crystallizable polymers are available, or can be prepared, with a wide range of melting points, from which a selection can be made and employed as a meltable material in threshold indicators having a desired threshold temperature corresponding with the melting point of a selected polymer.

Thus, the polymers in Table 1 exhibit melting points ranging from a low of −34° C. for poly(dodecylmethacrylate) to a high of 56.0° C. for the copolymer of dodecylacrylate and docosylacrylate. The examples of polymers with intermediate melting points are well distributed throughout the range. Polymers with zero and sub-zero melting points can be employed in threshold indicators employed for monitoring host products intended to be maintained at zero or sub-zero temperatures.

The data in Table 1 also illustrate how a threshold indicator having a desired threshold temperature can be achieved by adapting the melting point of the meltable material in a number of different ways. For example, the chain length of the polymeric alkyl side chain, or chains, can be varied. Shorter alkyl chains provide lower melting points, and longer chains provide higher melting points.

If desired, the meltable material can comprise a copolymer of two or more monomers and the relative proportion, or proportions, of monomer units in the copolymer, as well as the chain lengths of the polymer side chains can be varied to provide a suitable melting point. As illustrated by the several examples of copolymers of decylacrylate and tetradecylacrylate in Table 1, a higher proportion of a monomer having a longer alkyl chain can provide a higher melting point, whereas a higher proportion of a monomer having a shorter alkyl chain can provide a lower melting point.

Furthermore, in making the polymer, the degree of polymerization of the monomer or monomers employed can be controlled thereby controlling the molecular weight of the resultant polymer. Also, the degree of conversion of monomer to polymer can be limited, for example, by interrupting the polymerization reaction, as is described in O'Leary et al. The degree of conversion can be calculated as the ratio of the mass of polymer to the total mass of monomer starting material. As an example, the degree of conversion can be limited to be less than one hundred percent to yield a polymer with a melting point different from that of the fully converted polymer. This possibility is illustrated in Table 1 by the copolymer of hexylacrylate and dodecylacrylate. At 100% conversion, based on the combined mass of monomers employed, a product having a melting point of 7.6° C. is obtained. At 10% conversion, the product has a melting point of −6.2° C.

Another option for adjusting the characteristics of a side-chain crystallizable polymer is to introduce branching into the polymer structure by including one or more chain transfer agents or other useful branching agents in the polymerization process. One example of a suitable chain transfer agent is mercaptoethanol, which can be employed in any suitable proportion, for example, up to about 5% by weight based on the weight of monomer or monomers employed in the polymerization process. A branched polymer can have a higher melting point than the corresponding unbranched polymer. Also, some branched polymers can have less sharp melting points than the corresponding unbranched polymers, i.e., the melting point range of the branched polymer can be longer than that of the unbranched polymer.

A further option for adjusting the characteristics of a side-chain crystallizable polymer is to introduce crosslinking into the polymer structure by including one or more crosslinking agents in the polymerization process. A bifunctional acrylic or methacrylic ester or other suitable compound can be included in the polymerization process to function as a crosslinking agent and yield a crosslinked polymer product.

By way of example, a side-chain crystallizable polymer can be crosslinked to reduce the melt flow rate, or diffusion rate of the polymer. A relatively low crosslink density, for example from about 0.01 to about 0.09 intermolecular crosslinks per polymer chain, or weight average molecular weight, can be employed.

The presence of crosslinking or branching can reduce the crystallinity of a side-chain crystallizable polymer. Such structure can increase the melting point of the material. Crosslinking can increase the molecular weight of the side-chain crystallizable polymer and the higher molecular weight material can have a narrow melting point peak, as measured by differential scanning calorimetry. With a higher molecular weight, a side-chain crystallizable polymer can be more viscous.

The foregoing possibilities illustrate how the characteristics of a side-chain crystallizable polymer can be "tuned" to a particular application. The number of carbon atoms in the side chain or chains can be varied. A copolymer can be employed, and the lengths and proportions of the monomer units in the copolymer can be varied. The degree of conversion of the monomer units in the polymerization process can be varied to vary the molecular weight or for other purposes. Moreover, the polymerization process can be modified to yield a polymer product having a controlled degree of branching and/or crosslinking.

Suitable copolymers can be random or block, such as diblock and triblock. Polymers can be prepared by any known suitable polymerization method, which can include chain-growth polymerization, examples of which are free radical polymerization, anionic polymerization, cationic polymerization, and coordination polymerization.

Side-chain crystallizable polymers useful in the practice of the invention are also described in U.S. Pat. Nos. 5,156, 911 and 8,671,871, which disclosures are incorporated by reference herein for all purposes. Some useful side-chain crystallizable polymers, and monomers for preparing side-chain crystallizable polymers, are also available from commercial suppliers, for example, Scientific Polymer Products, Inc., Ontario, N.Y.; Sigma-Aldrich, Saint Louis, Mo.; TCI America, Portland Oreg.; Monomer-Polymer & Dajac Labs, Inc., Trevose, Pa.; San Esters Corp., New York, N.Y.; Sartomer USA, LLC, Exton Pa.; and Polysciences, Inc.

Suitable side-chain crystallizable polymers include polymers and copolymers of methacrylates and acrylates having linear aliphatic side chains capable of becoming crystalline at a temperature of interest to achieve the objectives discussed herein, for example a melting temperature in the range of from about −5° C. to about 60° C. The side chains can have at least 10 carbon atoms, for example from about 10 to about 22 carbon atoms. In some embodiments, the side chains can have up to about 30 or more carbon atoms. Some examples of such polymers include poly(alkylmethacrylates) such as poly(hexadecylmethacrylate) and poly(octadecylmethacrylate), poly(alkylacrylates) such as poly(hexadecylacrylate) and poly(dodecylacrylate), copolymers such as a copolymer of hexadecylacrylate and octadecylmethacrylate, poly(hexyl-co-dodecylacrylate), a copolymer of tetradecylacrylate and octadecylacrylate, a copolymer of hexadecylmethacrylate and octadecylmethacrylate, and a copolymer of tetradecylacrylate and hexadecylacrylate. Mixtures of two or more of any of the side-chain crystallizable polymers described herein can also be employed.

Some examples of additional polymers useful in the practice of the invention have chains of interconnected monomer units X of formula:

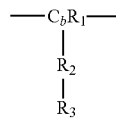

wherein:
$C_b$ is a backbone carbon atom;
$R_1$ is hydrogen, a substituted or unsubstituted hydrocarbon group
having up to about six carbon atoms;
$R_2$ is an optional spacer unit; and
$R_3$ is a crystallizable group.
$R_2$ and $R_3$ together make up the side chain of the monomer unit.

Spacer unit $R_2$, if present, can be any suitable organic or inorganic group, for example an ester, amide, hydrocarbon, phenyl, or ether group. Optionally, spacer unit $R_2$ can be O, $CH_2$, (CO), O(CO) or $NR_4$, wherein $R_4$ is hydrogen or lower alkyl having from one to about six carbon atoms.

The crystallizable group $R_3$ can be, or can include, an aliphatic group having from 4 to about 30 carbon atoms, an aromatic group having from 6 to about 30 carbon atoms, a linear aliphatic group having at least 10 carbon atoms, a combination of at least one aliphatic group and at least one aromatic group, the combination having from 7 to about 30 carbon atoms, a $C_{14}$-$C_{22}$ acrylate, a $C_{14}$-$C_{22}$ methacrylate, an acrylamide, a methacrylamide, a vinyl ether, a vinyl ester, or a fluorinated aliphatic group having at least 6 carbon atoms, or a p-alkyl styrene group wherein the alkyl group has from about 8 to about 24 carbon atoms.

$R_3$ can be crystallizable or can include a crystallizable region. $R_3$ can be sufficiently crystallizable to provide the polymer a desired degree of crystallinity, as described herein, if desired.

The side chains in a molecule of a side-chain crystallizable polymer employed in the practice of the invention can all be the same, or some side chains can differ from other side chains in the polymer molecule. For example, the side chains can be of two or more different kinds, according to the nature of the monomers from which the polymer is formed. Alternatively, where the side chains differ, the spacer units can differ, or the crystallizable groups can differ or both the spacer units and the crystallizable groups can differ.

The polymer backbone of the side-chain crystallizable polymer can have an organic structure including a series of backbone carbon atoms $C_b$. Backbone carbon atoms $C_b$ can be connected directly to each other. Alternatively, one or more pairs of adjacent backbone carbon atoms $C_b$ can be interconnected through an intervening atom, or atoms, for example, an oxygen atom or the carbon atom or atoms in one, two or three methylene groups.

The polymer backbone can be substituted or unsubstituted and can employ or consist of saturated or unsaturated aliphatic hydrocarbon groups, aromatic hydrocarbon groups, ester groups, ether groups, amide groups, or other suitable organic groups. The side chains can be substituents in any of these groups that incorporates a backbone carbon atom $C_b$.

A side-chain crystallizable polymer employed in the practice of the invention can consist entirely or partially of monomer units X. For example, the polymer can contain from about 50 mole percent to about 100 mole percent of monomer units X.

If the side-chain crystallizable polymer contains less than 100 percent of X monomer units, the balance can be made up of Y monomer units or Z monomer units, or of both Y monomer units and Z monomer units, wherein Y is a polar or nonpolar monomer unit or a mixture of polar and nonpolar monomer units, and wherein Z is a polar monomer unit or a mixture of polar monomer units. A polar Y or Z monomer unit, if present, can include any suitable polar group, for example, an oxy group, a hydroxyl group, a carboxyl group, an ester group, an amine group or an amide group. Some examples of suitable polar monomer units include polyoxyalkylenes, acrylates, hydroxyethylacrylate, acrylamides and methacrylamide.

Some examples of suitable nonpolar Y units include linear and branched alkyl and aryl acrylates and methacrylates, alpha olefins, linear and branched alkyl vinyl ether and vinyl esters, maleic esters, itaconic acid esters, acrylamides, styrenes and substituted styrenes, acrylic acid, methacrylic acid and hydrophilic monomers.

Side-chain crystallizable polymers including polar groups, if used in, or as, transport materials that are supported in contact with a transport member in the practice of the invention, can exhibit adhesion to the transport member. Side-chain crystallizable polymers that exhibit limited adhesion can be useful to provide a slower rate of displacement of the meltable material along the transport member, above the activation temperature, if desired.

Suitable side-chain crystallizable polymers can have any suitable heat of fusion, for example, a heat of fusion of at least about 20 Joule/g, at least about 20 Joule/g, or at least about 40 Joule/g.

Some further examples of useful polymers include fluoroacrylate polymers, vinyl ester polymers, acrylamide polymers, substituted acrylamide polymers, maleimide polymers, polyalkylvinylether polymers, polyalkylethylene oxide polymers, polyamino acids, polyisocyanates, polyurethanes, polyesters, polyethers, and p-alkylstyrene polymers.

The monomer unit of a homopolymeric side-chain crystallizable polymer employed in a threshold indicator as discussed herein can include a side chain which is a straight-chain alkyl group, i.e. an n-alkyl group, if desired. Optionally, the side chain can have an even number of carbon atoms. The monomer unit of the polymer can consist solely of a suitable backbone unit and a single straight-chain alkyl group. Also, the backbone unit can consist solely of a single acrylate group, or of a single methacrylate group, or of another suitable group.

The monomer unit can include one or more groups in addition to a single alkyl group, for example, another alkyl group, optionally, a straight chain alkyl group, that does not adversely affect the crystallizability of the polymer.

Optionally, the monomer unit can include a functional group or functional groups, for example, one or more hydroxyl, halo, amino, nitro, phenyl, or unsaturated groups, located in a side chain, and/or the backbone of the monomer unit.

A suitable copolymeric side-chain crystallizable polymer can include first monomer units that are similar to a homopolymer monomer unit described herein. The copolymer can also include second monomer units that are similar to a different homopolymer monomer unit described herein or that are unlike the homopolymer monomer units described herein.

Alternatively, the second monomer units can have one or more structural differences from the homopolymer monomer units described herein, for example, a different chain length, branching, a substituent group, unsaturation or one or more other structural differences. All the second monomer units can be similar to one another. Alternatively, two or more types of second monomer units can be employed. The different types of second monomer unit can differ by chain length, by branching characteristics, by saturation, by substitution, or by one or more other structural characteristics.

The meltable material can have a viscosity at, or near, the threshold temperature, for example, within 2° C. of the threshold temperature, which facilitates monitoring threshold temperature exposure. For example, the meltable material viscosity at the threshold temperature can be in a range of from about 20 cP, or 25 cP, to about 100,000 cP; a range of from about 50 cP to about 5,000 cP; or a range of from about 100 cP to about 500 cP, or a range of from about 40 cP to about 1,000 cP.

By way of further example, the meltable material can have a viscosity that is at least 20 cP, at least 25 cP, at least about 50 cP, or at least about 100 cP. In some embodiments, the meltable material can have a viscosity that is not greater than about 500 cP, not greater than about 5,000 cP, or not greater than about 100,000 cP. Further, the meltable material can have a viscosity that is in a range from any one of said lower viscosity limits to any one of said higher viscosity limits.

Depending upon the application, i.e., the nature of the host product to be monitored, the meltable material can be solid or can be a viscous liquid at room temperature. For example, at a room temperature of 20° C., the meltable material, if liquid, can be a material having a viscosity of at least about 20 cP, or at least about 100 cP. Once liquefied and even prior to full liquefaction, the two or more reactants are able to migrate through the meltable material to react with each other.

If the viscosity of the meltable material is too low, the reaction rate between the two or more reactants can be too rapid to correlate satisfactorily with the temperature response characteristics of a particular host product. If the viscosity of the liquid meltable material is too high, the reaction rate between the two or more reactants can be too slow to correlate satisfactorily with the temperature response characteristics of a particular host product.

One or more performance modifiers can be added to the meltable material to modify one or more physical characteristics of the meltable material. Such performance modifiers can enhance the temperature response characteristics of the meltable material to better relate the temperature response characteristics to the temperature sensitivity characteristics of an intended host product, or perform some other useful function. A performance modifier, or performance modifiers, if employed, can generally comprise a minor proportion by weight of the meltable material. For example, the meltable material can include a proportion of performance modifier, or performance modifiers, from 0 to about 20 percent by weight, or a proportion of from 0 to about 10 percent by weight, or a proportion of from about 0.5 percent to about 5 percent by weight, based on the weight of the meltable material.

If the meltable material includes one or more performance modifiers, the balance of the meltable material can be made up by one or more transport materials. The meltable material balance optionally can include an optically distinctive material in a proportion as described herein. The balance of the meltable material can consist entirely of transport material and optically distinctive material, if present, or can include up to about 10%, or up to about 5% by weight, based on the weight of the meltable material, of one or more other ingredients that do not adversely affect the properties of the meltable material. Some examples of useful performance modifiers include viscosity modifiers, plasticizers, and diluents.

Examples of viscosity modifiers that can be employed, alone or in combination, include: polyisobutylene; olefin copolymers; acrylic resins; vinyl acetate resins; ELVAX™ ethylene-vinyl acetate/acid copolymer resin (E.I. duPont de Nemours and Company, Wilmington Del.), for example, ELVAX products nos. 210, 410, 40W, 150, 350, and 4310; PARALOID acrylic resins (The Dow Chemical Company (Midland, Mich.); VANTACK™ viscosity modifiers, for example, products nos. 105, and 85, from R.T. Vanderbilt Company Inc. (Norwalk, Conn.); polyisobutylene products nos. PIB85MM, and PIB100MM (Soltex Houston, Tex.); and poly(alpha-olefins), including any one or more of products nos. PAO 2 to PAO 100 from Soltex.

Examples of plasticizers that can be employed, alone or in combination, include glycerol esters, alkyl phthalates, polyethylene glycols, polyethylene glycols having a molecular weight of from about 2,000 to about 20,000. Other examples include; ADMEX® plasticizers (ADMEX 523, 6696, 770) from EASTMAN, PALATINOL® and PALAMOLL® plasticizers from BASF and Jayflex™ from EXXON Mobile.

Examples of diluents that can be employed, alone or in combination, include polyols, glycerol oil, and POLYALDO™ polyglycerol ester diluents (Lonza Group Ltd., Basel, Switzerland).

Color Reactants

According to some embodiments, the threshold indicators discussed herein can utilize two or more reactants that are chemically co-reactable to provide a color change or visual change in appearance, wherein the visual change is a chemical reaction. This chemical reaction is allowed to happen when at least one of the two or more reactants is able to migrate toward the other reactant(s) through a meltable material. In response to a threshold or peak temperature exceeding the melting point of the meltable material, it softens or becomes amorphous or liquid thereby allowing the two or more reactants to migrate to each other. In some embodiments, one or more of the two or more reactants is initially colorless or exhibits a light color, and the resulting reaction produces a different color, a darker color, or a different hue of the initial color. Some indicators disclosed here take advantage of the sometimes intense colors produced in a Seliwanoff reaction or test, a well-known color-forming reaction for the identification of ketose sugars. This and similar tests such as the Molisch, the Bial, and the Tollen tests for carbohydrates in general all take advantage of interaction between a, phenol an aldehyde and an acid to produce a chromogenic response. Typically, the aldehyde produced in these reactions is furfural or derivative thereof such as a substituted furfural. All these various chemistries can be taken advantage of for the preparation of indicators disclosed herein.

According to some embodiments, the two or more reactants include bromothymol blue and butylamine, resorcinol and 5-(hydroxymethyl)furfural (HMF) (which may be accompanied by a catalyst such as hydrochloric acid or dodecylbenzenesulfonic acid (DSA)), anthocyanins, leucocrystal dyes, methyl red, methyl orange, other pH indicators and acids such as phosphoric or p-toluene or sulfonic acid. In place of resorcinol, other aromatic hydroxy compounds can be employed such as phenol (which is known to produce a green coloration with hydroxymethylfurfural), orcinol (5-methyl-1,3-benzenediol), or alpha naphthol. Other substituted phenols and resorcinols could be used. Likewise, in addition to 5-(hydroxymethyl) furfural, other substituted furfurals and aldehydes could be used. Similarly, a wide range of other acid catalysts may find application such as alkyl or alkylaryl sulfonic acids generally represented by the formula $RSO_3H$, where R is an alkyl or alkylaryl group; or, alkyl and dialkyl and alkylaryl and dialkylaryl phosphoric acids generally represented by the formula $(R_1O)(R_2O)P(O)OH$ where $R_1$ is H, alkyl or alkylaryl and $R_2$ is alkyl or alkylaryl; alkyphosphonic or alkylarylphosphonic acids generally represented by the formula $R_1P(O)(OR_2)(OR_3)$ where $R_1$ is alkyl or alkylaryl, $R_2$ and $R_3$ are H, alkyl, aryl or alkylaryl where at least one of $R_2$ and $R_3$ is H and phosphinic acids generally represented by the formula $R_1R_2P(O)OH$ where $R_1$ and $R_2$ are alkyl or alkylaryl groups. In some cases the actual groups are chosen to achieve or maintain solubility in an SCC polymer side chain. In some embodiments, mixtures of these components may be used so that mixtures of furfurals, mixtures of phenolics, and mixtures of acids can be employed in making the indicators disclosed herein.

In some embodiments, one of the reactants is chosen from a group consisting of an oil-soluble reducing agent, oxalic acid, phosphite ester, hydroxybenzoic acid ester, hydrohydroquinone, a hydroquinone derivative such as dimethylhydroquinone, di-tert-butyl hydro quinone, dialkylhydroquinone, 3-ethoxyphenol, 1,2-diethyl-3-hydroxybenzene, 1,3-diethyl-2-hydroxybenzene, 2,2'-methylenebis(3,4,6 trichlorophenol); meltable, or sensitizer-soluble, primary and secondary amines having low water solubility, for example, 4-butyl-aniline, phenol derivatives, organic acids, acid clays, reactive acid hectorite clay, phenolic resins, phenol-acetylene resins, polyvalent metallic salts of phenolic resins, zinc-including modified alkyl phenolic resin, zinc salicylate, zinc salicylate resin, 4,4'-isopropylidenebisphenol (also known as bisphenol A), 1,7-di(hydroxyphenylthio)-3,5-dioxaheptane, 4-hydroxyethyl benzoate, 4-hydroxydimethyl phthalate, monobenzyl phthalate, bis-(4-hydroxy-2-methyl-5-ethylphenyl)sulfide, 4-hydroxy-4'-isopropoxydiphenylsulfone, 4-hydroxyphenylbenzenesulfonate, 4-hydroxybenzoyloxy-benzylbenzoate, bis-(3-1-butyl-4-hydroxy-6-methylphenyl) sulfone, p-tert-butylphenol, or polymers based on bisphenol A.

In some embodiments, one of the reactants is chosen from a group including 3,3-bis(p-dimethylaminophenyl)-phthalide, 3,3-bis(p-dimethylaminophenyl)-6-dimethylaminophthalide (crystal violet lactone), 3,3-bis(p-dimethylaminophenyl)-6-diethylaminophthalide, 3,3-bis(p-dimethylaminophenyl)-6-chlorophthalide, 3,3-bis(p-dibutylaminophenyl)-phthalide, 3-(N—N-diethylamino)-5-methyl-7-(N, N-dibenzylamino) fluoran, 3-dimethylamino-5,7-dimethylfluoran, 3-diethylamino-7-methylfluoran, 3-(2'-hydroxy-4'-dimethylaminophenyl)-3-(2'[-methoxy-5'-chlorophenyl)phthalide, 3-(2'-hydroxy-4'-dimethylaminophenyl)-3-(2'-methoxy-5'-nitrophenyl-phthalide, 3-(2'-hydroxy-4'-diethylaminophenyl)-3-(2'-methoxy-5'-methylphenyl)phthalide, 3-(2'-methoxy-4'-dimethylaminophenyl)-3-(2'-hydroxy-4'-chloro-5'-methylphenyl)-phthalide, benzoylleuco methylene blue, malachite green lactone, N-2,4,5-trichlorophenylleucoauramine, 3-diethylamino-6-methyl-7-chlorofluoran, 3,6-bis(diethylamino)fluoran-γ-(4'-nitro)-anilinolactam, 3-diethylamino-6-methyl-7-anilinofluoran, 3-(N-ethyl-N-isoamylamino)-6-methyl-7-anilinofluoran, 3-cyclohexylamino-6-chlorofluoran or 3-diethylamino-6,8-dimethylfluoran.

Threshold Indicators

A threshold indicator according to this disclosure can include a substrate supporting the indicator element, the element comprising a first and second meltable layer, each layer including at least one reactant. The threshold indicator can be configured as a label, a flexible label, a tag, a package insert, or a package component.

Embodiments of threshold indicators can be associated with a host product that the threshold indicator is intended to monitor for ambient temperature exposure, for example, by attachment to or association with the host product, or with packaging for the host product. Some embodiments include a threshold indicator attached to or associated with a host product or its packaging.

Substrates employed in some embodiments may be configured to be conformable with a host product, or packaging for a host product, for example a vaccine vial containing a vaccine. The substrates may be flat to conform with a flat surface of the host product (or to a package containing the host product). Alternatively, the substrate may be curved in one dimension, or in two dimensions, to conform with a curved surface of the host product (or of a package containing the host product), for example, the curved surface of a cylindrical vaccine vial. Also, a substrate may enable the dual-function heat indicator to be attachable to a host product, for example, by bearing a pressure-sensitive adhesive layer. Adhesive attachment is one example of different ways in which the dual-function heat indicator may be associated with a host product to monitor the host product for heat exposure. Possible different ways of attachment include, for example, adhering, tying, looping, and stapling, to the host product directly, or to a package containing the host product, or to a package, carton, box or other container containing a number of host product items. Further, a dual-function heat indicator embodied in a label, or tag, may be inserted in a host product package, carton, or other container for one or more host product items.

For some threshold indicator applications, avoidance of a need for cold storage of indicator labels prior to use is desirable. For this and other reasons, threshold indicators that can be activated when associated with a host product are contemplated herein. Some activatable threshold indicators require intervention to remove a separator between two indicator components, thereby enabling contact between the two indicator components to initiate or allow an indicator reaction to occur upon the occurrence of a threshold temperature event. Other indicator activation techniques are known that also require intervention to effect activation, such as physically securing two indicator components together.

Some embodiments of a threshold indicator according to the present disclosure can exhibit an unmistakable heat-induced appearance change in a relatively short period of time, for example within a few minutes of exposure to a temperature at and/or above the threshold temperature, or a higher temperature. In some embodiments, the heat-induced change in appearance is delayed, which delay can be controlled using the techniques and materials discussed herein. Contemplated embodiments include mass-produced threshold indicators that yield an unmistakable heat-induced appearance change, consistently and reliably, from one sample to the next.

To signal past exposure to a threshold temperature, threshold indicators according to the present disclosure exhibit an irreversible change in appearance. In other words, the color change or change in opacity that results from the color-forming reactants coming into contact with each other does not diminish or reverse with time even if the indicator is exposed to temperatures below the threshold temperature.

Figure 2A:
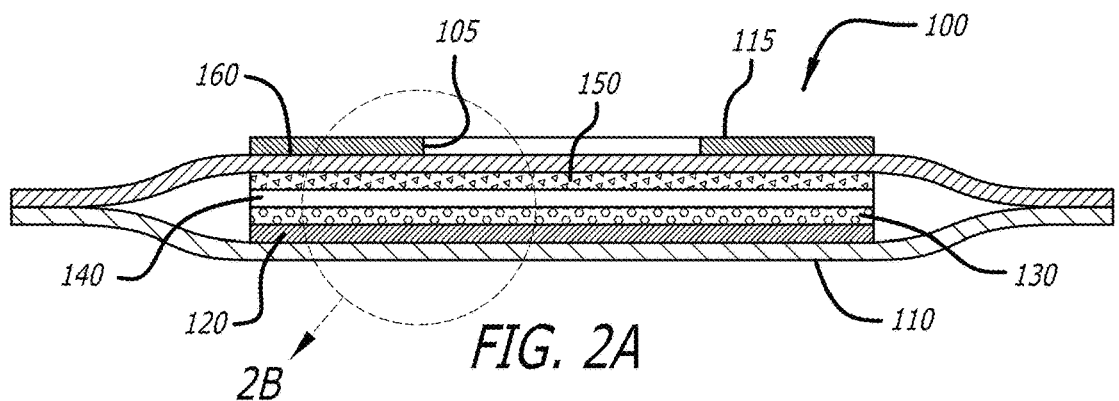
FIG. 2A is a sectional view on the line 2-2 of one example embodiment of one of the example threshold temperature indicators shown in FIG. 1

According to some embodiments, a delayed reaction threshold temperature indicator includes a substrate and a housing affixed or secured to the substrate, and in the space created between the substrate and housing are two layers of a meltable solid. Each layer may comprise the same or a different meltable solid. FIG. 1 illustrates one such embodiment of an indicator 100 positioned on a supporting substrate 110. Indicator 100 includes a viewing window 105 and an optional reference area 115 that in this embodiment surrounds viewing window 105. FIG. 2A illustrates a cut-away view of indicator 100 taken along line 2-2. This view highlights the various layers including substrate 110 and a housing 160 between which are a first meltable solid layer 130 and a second meltable solid layer 150.

First meltable solid layer 130 includes a first meltable solid and at least one reactant that may be a color-forming reactant as discussed herein. Second meltable solid layer 150 includes a second meltable solid and at least one reactant. First and second meltable solids may be comprised of the same or different meltable polymers.

Figure 2B:
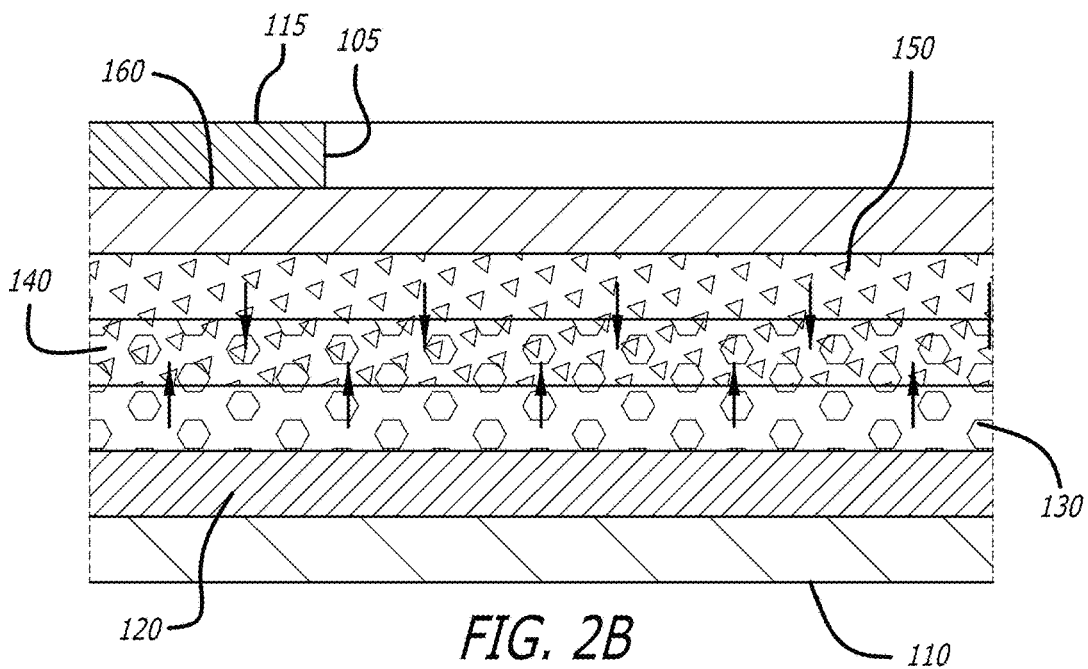
FIG. 2B is an enlarged view of a portion of FIG. 2A.

At temperatures below the melting point of the first and/or second meltable solids, the respective reactants remain within first meltable solid layer 130 and second meltable solid layer 150, respectively. FIG. 2B—which illustrates an enlarged view of a portion of indicator 100 of FIG. 2A—demonstrates that at temperatures near and/or above the melting point of the first and/or second meltable solids, the reactants are able to migrate through the meltable solid layers to then react with each other thereby causing a chemical reaction, the product of which has a different appearance than the unreacted reactants. The meltable material(s) is selected so that the change in morphology resulting from exposure to temperatures at or near the melting point(s) of the material(s) allows the reactants to migrate through the respective layers but at a time and temperature dependent rate. This produces not simply an indication of exposure to a threshold temperature, but also an indication of how long the indicator has been exposed to the threshold temperature. In some embodiments, the reactants in first meltable solid layer 130 will migrate toward the reactants in second meltable solid layer 150 or visa versa or they will both migrate toward each other.

In some embodiments, the melting point of the meltable solid(s) is from about −20° C. to about 80° C., from about −10° C. to about 50° C., from about −5° C. to about 40° C., from about 0° C. to about 30° C., from about 10° C. to about 25° C., from about 15° C. to about 25° C., from about 17° C. to about 23° C., or the melting point of the meltable solid(s) is any value between or at the boundaries of any one of these ranges, such as about −10° C., about −5° C., about 0° C., about 5° C., about 10° C., about 15° C., about 20° C., about 25° C., or about 30° C.

In some embodiments, the period of time between exposure to a threshold temperature and the observation of a change in appearance is from about 2 minutes to about 120 minutes, from about 5 minutes to about 60 minutes, from about 10 minutes to about 50 minutes, from about 15 minutes to about 40 minutes, from about 20 minutes to about 30 minutes, from about 21 minutes to about 26 minutes, or the period of time is any value between or at the boundaries of any one of these ranges.

Both the melting point of the meltable solid(s) and the period of time between exposure to a threshold temperature and the observation of an appearance change can be a function of the molecular weight of the meltable solid. In some embodiments, the molecular weight of the meltable solid(s) is from about 1,000 Da to about 400,000 Da, from about 2,000 Da to about 300,000 Da, from about 3,000 Da to about 200,000 Da, from about 5,000 Da to about 30,000 Da, from about 8,000 Da to about 24,000 Da, or any value between or at the boundaries of any one of these ranges. In some embodiments, the meltable solid(s) is a polymer. In some embodiments, the polymer is a side-chain-crystalline polymer.

The reactant contained in first meltable solid layer 130 may be present in any suitable amount. In some embodiments, the weight percent of the reactant in first meltable solid layer 130 is about 0.05% to about 20%, about 0.1% to about 10%, about 0.2% to about 5%, about 0.5% to about 3%, about 1% to about 2%, or any value between or at the boundaries of any one of these ranges.

The reactant contained in second meltable solid layer 150 may be present in any suitable amount. In some embodiments, the weight percent of the reactant in second meltable solid layer 150 is about 0.1% to about 40%, about 0.5% to about 20%, about 1% to about 15%, about 1.5% to about 10%, about 2% to about 5%, or any value between or at the boundaries of any one of these ranges. In some embodiments, the amount in terms of moles or weight of the reactant in second meltable solid layer 150 is greater than the amount of reactant in first meltable solid layer 130 or vice versa. In some embodiments, the amount is sufficient to react substantially all of the reactant in first meltable solid layer 130 or substantially all of the reactant in second meltable solid layer 150. In some embodiments, the amount is sufficient to react at least about 50%, at least about 60%, at least about 70%, at least about 80%, at least about 90%, at least about 95%, or at least about 97% of the reactant in first meltable solid layer 130 or of the reactant in second meltable solid layer 150. In some embodiments, the weight ratio of the first reactant to the second reactant or the second reactant to the first reactant is at least about 1:1, at least about 1:1.2, at least about 1:1.4, at least about 1:1.5, at least about 1:1.6, at least about 1:1.8, at least about 1:2, or at least about 1:3. In some embodiments, the molar ratio of the first reactant to the second reactant or the second reactant to the first reactant is at least about 1:1, at least about 1:1.2, at least about 1:1.4, at least about 1:1.5, at least about 1:1.6, at least about 1:1.8, at least about 1:2, or at least about 1:3.

Another factor that may affect the time required for the respective reactants to migrate through the meltable solid layers is the thickness of the layers. Each layer may be the same or a different thickness, and the thickness may be from about 0.1 mm to about 10 mm, from about 0.5 mm to about 5 mm, from about 1 mm to about 4 mm, or any value between or at the end points of these ranges, such as about 1 mm, about 2 mm, or about 3 mm.

Housing 160 includes viewing window 105 through which first and second meltable solid layers 130,150 are visible such that when the reactants produce a visually observable reaction or reaction product, this change in appearance is visible through the viewing window. Indicator 100 may also include a background 110 on substrate 110 that may be a color, a pattern, or an indicia that may be separate from or an extension of reference area 115 shown in FIG. 1. In some embodiments, viewing window 105 comprises a cutout of reference area 115. Background 110 may be a separate layer or a printed color or pattern on substrate 110. The presence of background 110 may facilitate the observation of an appearance change in the meltable solid layers. For example, if the reaction product is a dark color or increased opacity, it may at least partially obscure background 110. Alternatively, background 110 may exhibit a color that is not easily visible when viewed through the color of the meltable solid layers prior to the reactants reacting with each other. In such configurations, the appearance change produced by the reaction of the reactants may render background 110 more visible or visually discernable.

FIGS. 2A and 2B also illustrate that indicator 100 may include a barrier layer 140 positioned between first and second meltable solid layers 130,150. Barrier layer 140 can be porous or microporous or otherwise permeable so as to allow one or both of the respective reactants to migrate through. In some embodiments, the barrier layer is selected so as to further control the amount of time that passes before the reaction product is visible. For example, if the reaction product is normally visible after about 10 minutes of exposure to a threshold temperature, the presence of barrier layer 140 may increase that delay by about 10 minutes for a total delay of 20 minutes. In some embodiments, the total delay is at least about 10 minutes, at least about 20 minutes, at least about 30 minutes, at least about 40 minutes, at least about 60 minutes, or at least about 120 minutes.

In some embodiments, barrier layer 140 comprises a meltable material, which may be the same as or distinct from the meltable solid(s) used in first and second meltable solid layers 130,150. In such configurations, barrier layer 140 may be configured to melt to allow the reactants to interact with each other, and barrier layer 140 may be permeable or non-permeable.

In some embodiments, barrier layer 140 is substantially impermeable so as to prevent the respective reactants from coming into contact until after barrier layer 140 is removed from indicator 100, which may occur just prior to securing the other layers together or after securing all the layers to together. In some embodiments, after the removal of barrier 140, it may be necessary to apply pressure to housing 160 so as to bring second meltable solid layer 150 into contact with first meltable solid layer 130.

As with each meltable solid layer 130 and 150, the thickness of barrier 140 can affect or control the period of time required for the threshold indicator to provide a visual indication of exposure to a temperature at and/or above a threshold temperature. The thickness of barrier 140 may be from about 0.01 mm to about 10 mm, from about 0.1 mm to about 5 mm, from about 0.5 mm to about 2 mm, or any value between or at the end points of these ranges.

FIG. 2A illustrates that housing 160 may be secured to substrate 110 around the periphery of first and second meltable solid layers 130,150. Indicator 100 may also include reference area or ring 115 positioned adjacent to or around the periphery of first and second meltable solid layers 130,150. In some embodiments, reference ring 115 is positioned around or forms viewing window 105. In some embodiments, viewing window 105 is formed in or as a part of housing 160. If present, reference ring 115 is configured to help determine if a color-changing reaction or change in appearance has in fact occurred. Reference ring 115 may have a color corresponding to either the color of either reactants prior to reaction or the color of the reaction product. In some embodiments, reference ring 115 is the same color as one or both of the unreacted reactants or the same color as the reaction product. In some embodiments, reference ring 115 is a color that contrasts well with the color of one or both of the unreacted reactants or the color of the reaction product.

As discussed herein, the indication of past exposure to a threshold temperature can be irreversible so as to give the threshold exposure signal provided by the threshold indicator some permanency. For example, the change in visual appearance can be incapable of being removed by shaking or cooling to normal refrigeration temperatures or to another non-destructive temperature. Such characteristics can permit the threshold indicators to be usefully employed with a wide range of products including pharmaceutical products, medical products, foodstuffs, and certain industrial products.

In some embodiments, the threshold indicators discussed herein can provide visual information to digital monitoring equipment. For example, the color change produced by the reaction between the two or more reactants may be such that it can be monitored by a digital device. In some embodiments, background 120 may have a barcode or other scannable pattern that is obscured or revealed by the color-forming reaction.

Figure 3A:
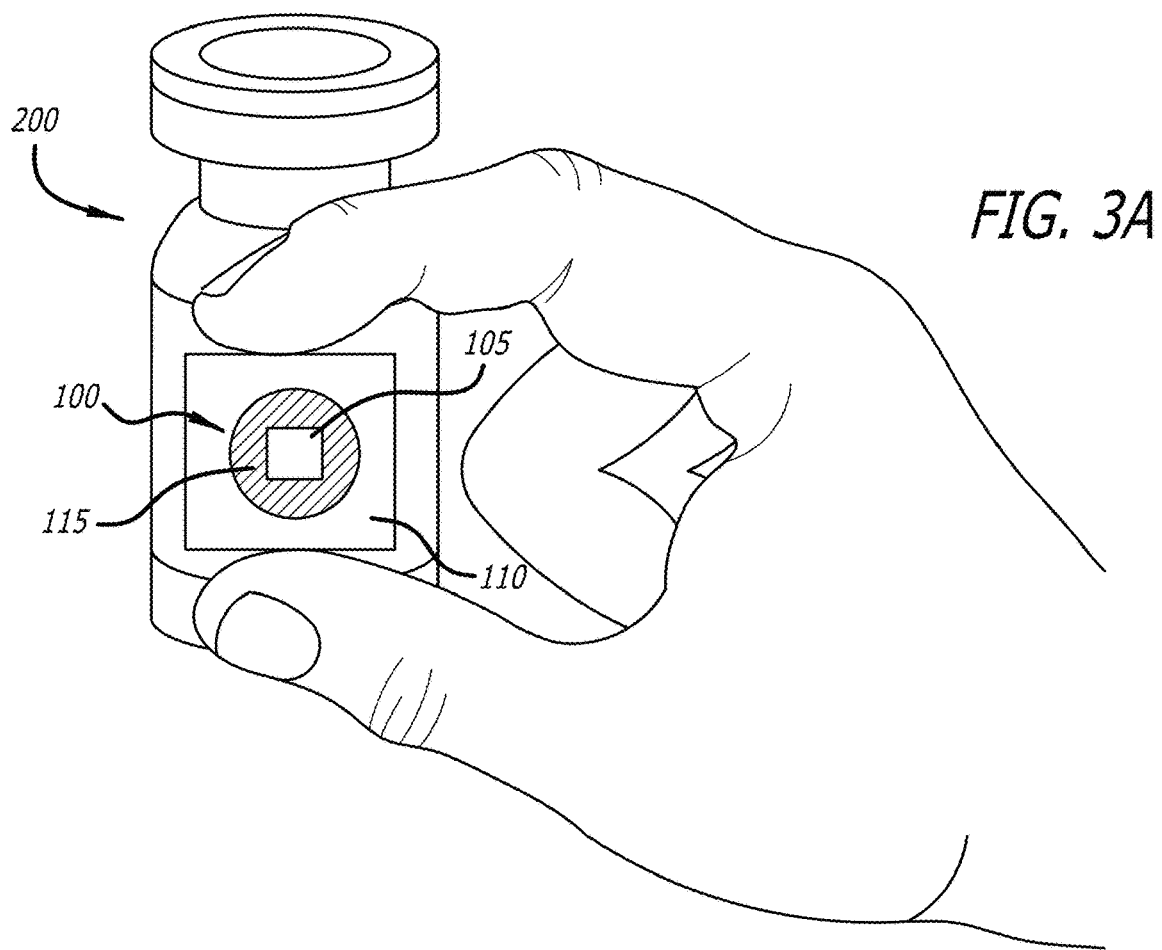
FIGS. 3A and 3B illustrate an example threshold temperature indicator secured to a vial both before and after exposure to a threshold temperature.
Figure 3B:
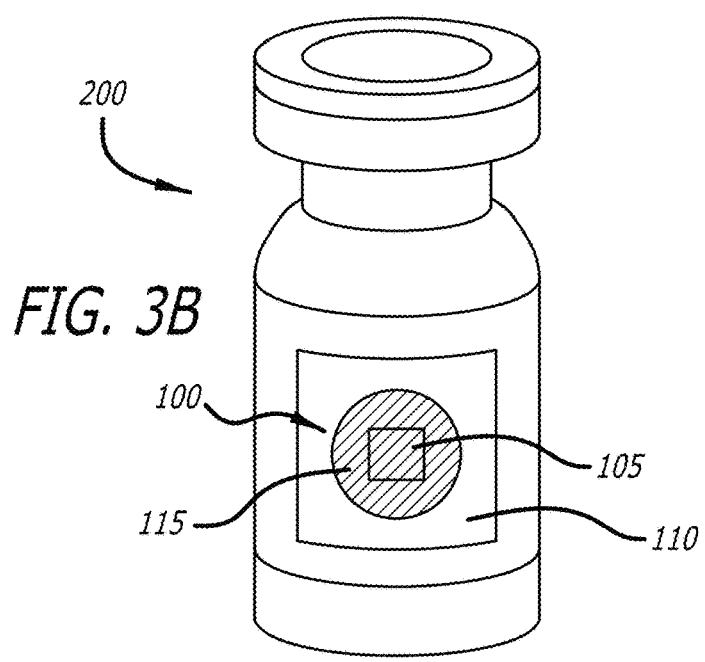
Figure 13:
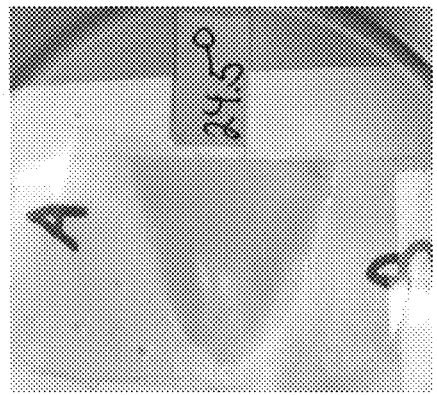
Figure 12:
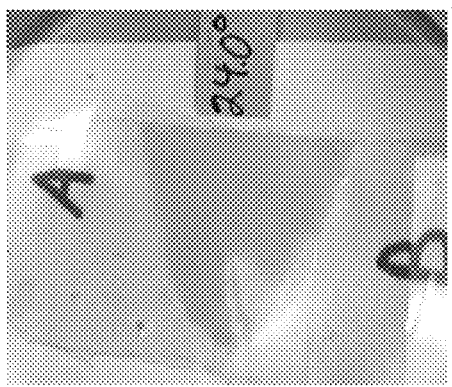
Figure 11:
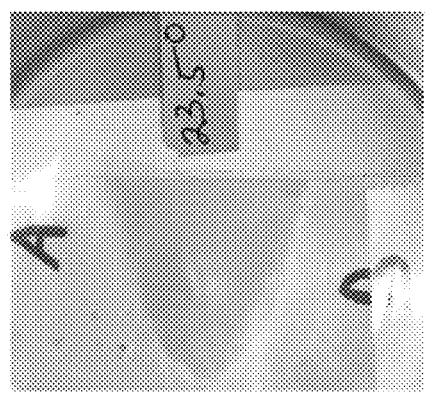
Figure 16:
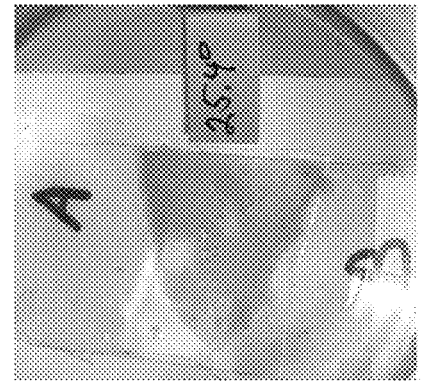
Figure 15:
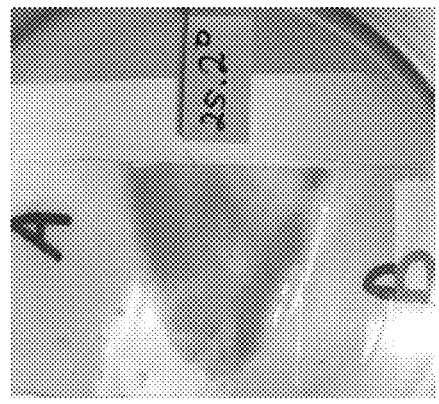
Figure 14:
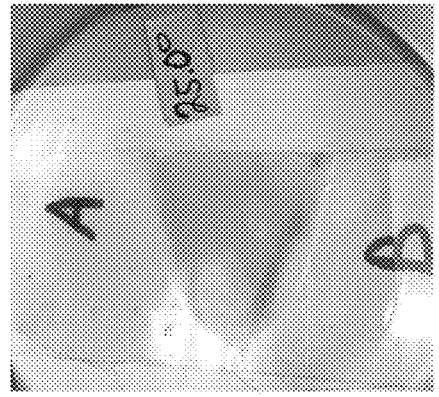

In some embodiments, substrate 110 can itself be adhered to an adhesive layer that may include a backing layer. (Although not illustrated, the same can be true for substrate 310 of indicator 300.) Removal of the backing layer then allows indicator 100 to be adhered to an object, such as a vaccine vial as illustrated in FIGS. 3A and 3B. The surface to which indicator 100 is adhered can be rounded (e.g., cylindrical) or flat. For example, although FIG. 3 illustrates indicator 100 as secured to the cylindrical surface of vial 200, it could be alternatively secured to the top of the cap on vial 200 or to the bottom surface of vial 200.

FIG. 3A illustrates one possible appearance of indicator 100 prior to exposure to a threshold temperature for the desired period of time. In contrast, FIG. 3B illustrates one possible appearance of indicator 100 after exposure to a threshold temperature for the desired period of time.

Figure 17:
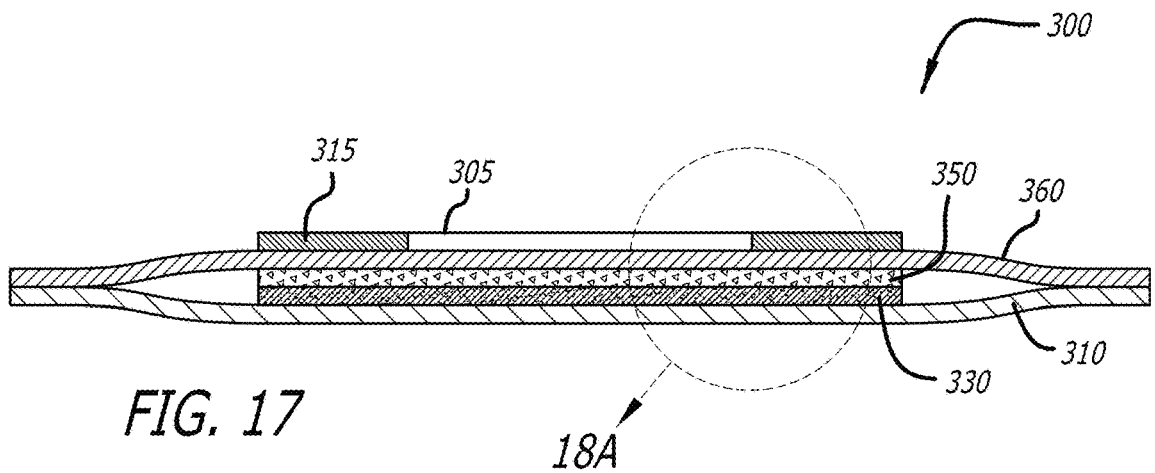
FIG. 17 is a sectional view on the line 2-2 of another example embodiment of one of the example threshold temperature indicators shown in FIG. 1.
Figure 18A:
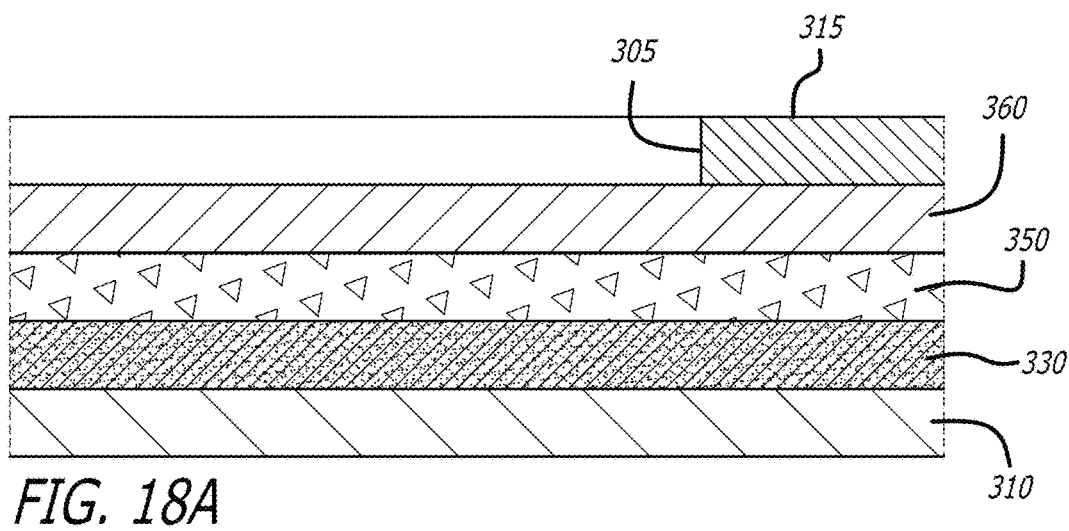
FIGS. 18A-18B are an enlarged view of a portion of FIG. 17.
Figure 18B:
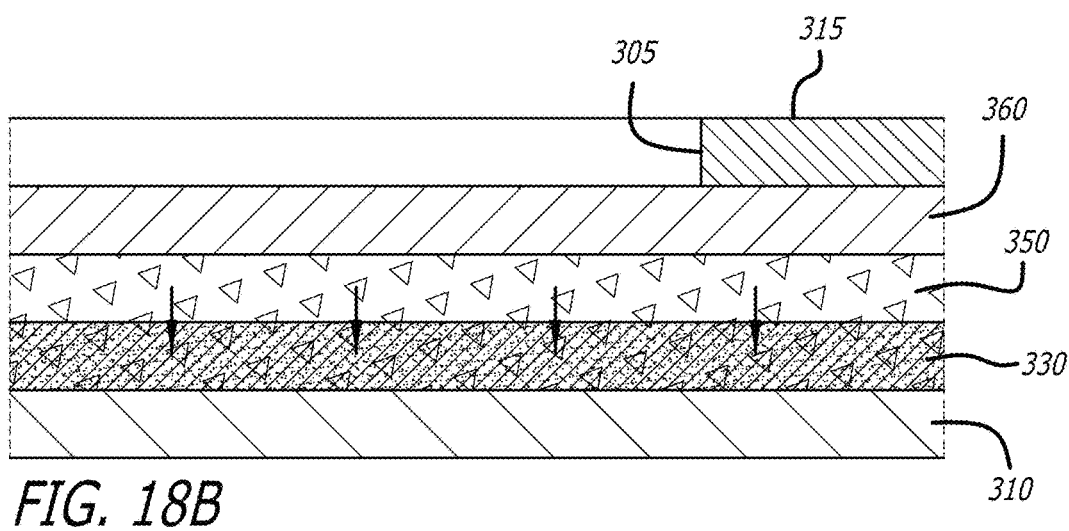

FIGS. 17, 18A, and 18B illustrate another embodiment of an indicator according to the present disclosure. Indicator 300 includes substrate 310, first layer 330, meltable solid layer 350, housing 360, and reference area 315 that surrounds or creates viewing window 305. In some embodiments, viewing window 305 is formed in or as a part of housing 360. Some embodiments may include a barrier layer as illustrated in FIGS. 2A and 2B between first layer 330 and meltable solid layer 350. Housing 360 can be secured to substrate 110 on the periphery of the stack created by first layer 330 and meltable solid layer 350.

Meltable solid layer 350 includes at least one reactant, and a second reactant is coated onto or infused into first layer 330. One or both layers may include additional reactants or reaction catalyzers. When the first and second reactants come into contact with each other, their reaction product is visually observable. So long as meltable solid layer 350 remains solid, the first reactant does not migrate or diffuse toward the second reactant. However, if indicator 300 is exposed to a temperature at and/or above the melting point of the meltable solid, the first reactant and/or the second reactant are able to move and interact as illustrated in FIG. 18B so as to produce a visual change in appearance. Housing 360 includes viewing window 305 through which such a change in appearance can be observed.

In some embodiments, first layer 330 includes a pattern or some other printed indicia that is either obscured by or revealed or made more visible by the change in appearance caused by the reaction between the first and second reactants. Such a pattern or printed indicia can help indicate whether indicator 300 has in fact been exposed to a threshold temperature for a desired period of time.

According to some embodiments, a threshold indicator of the present disclosure can be used in combination with one or more other condition change indicators. The conditions to be monitored by the optional, additional indicator(s) can include any number of environmental effects, such as cumulative temperature, pH, humidity, time, radiation, etc. The indicator according to the present disclosure and the one or more other condition change indicators can be provided separately or as a single indicator.

In some embodiments discussed herein, each reactant is combined with the meltable solid by mixing them at an elevated temperature to produce a uniform or semi-uniform mixture. A mixture is made for each reactant so as to create separate mixtures that are then brought together in the solid state to achieve a suitable delayed reaction threshold indicator as discussed herein. However, in some embodiments, the reactant can be encapsulated within the meltable solid. In such a configuration, then, it is possible to mix the separately encapsulated reactants into a single layer rather than keeping the reactants in separate layers of the meltable solid.

EXAMPLES

Example 1

The experimental objective was to ascertain the feasibility of solubilizing reactive materials in separate side-chain crystalline ("SCC") polymer formulations such that when coated onto appropriate substrates and then brought together they will react with a color change when the melt temperature is reached. The methodology employed was to use pH indictor dyes in one SCC formulation. A second formulation would include an acid or base designed to react with and cause a color change when mixed with the dye-containing formulation.

Several indicator dyes were investigated with bromothymol blue (BTB) winning out due to its solubility in the SCC polymer. The concentration of the BTB in SCC was 1.5% wt/wt. The BTB/SCC mixture was yellow in color. To pair with the BTB, butylamine was mixed into another sample of the same SCC polymer (2.5% wt/wt). The SCC polymer used in this experiment was a solvent-based polymer with a nominal melting point of 25° C.

Each formulation was coated onto clear Leneta sheets using a hot drawdown technique. The formulations were warm, above the melting point of the SCC polymer, and the Leneta sheet was fixed to a warm plate. The bird bar used for the drawdown was also warm. The warm liquid film drawdowns were promptly removed from the warm plate and the drawdowns quickly crystallized. The result of each drawdown was a wet film having a thickness of 3 mm. See FIG. 4.

Testing of the formulations was accomplished by cutting sections from each drawdown (FIG. 5) and then mating the sections face-to-face (FIG. 6). Bringing the polymer layers together constitutes "activation" of the threshold system. The activated indicator was placed on a TECA cold/hot plate set at 21.5° C. and the system monitored while the temperature increased in 0.5° C. increments until the response transition temperature is achieved (FIGS. 7-12). When the polymer layers of each half melt, the layers mix and the butylamine reactant causes the BTB indicator to change from yellow to blue (FIGS. 13-16).

An example of this prototype indicator was activated and stored at CRT 24 hours before testing for response. Tested in this manner the indicator changed color in the same manner as the directly after fabrication example.

This early scoping experiment shows that reactive compounds can be dispersed within separate SCC polymer layers, those layers brought together while solid without any reaction occurring, and then when the polymer melt point is reached, the layer mix and the response reaction is readily observable.

Example 2

In a demonstration of some initial ideas concerning the use of SCC polymers in temperature indicators, a prototype reactive chemical system was developed.

For the active response component of the indicator the Seliwanoff Reaction, a well-known color reaction for ketoses, was selected, because its end product results in a bright red color. The system described herein uses resorcinol and 5-(hydroxymethyl)furfural (HMF) with dodecylbenzenesulfonic acid (DSA) as a catalyst as shown in the following reaction sequence:

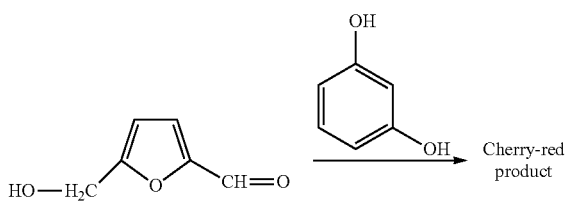 [SMILES: O=Cc1ccc(CO)o1 ; Oc1cccc(O)c1]

Both the resorcinol and HMF were found to be soluble in SCC polymer at concentrations up to 3% wt/wt and the DSA was also soluble at concentrations suitable for catalysis of the reaction. The SCC polymer used in these experiments was had a melting point of 25° C.

The reactive response of the system was probed by several modes of component interaction.

An SCC layer formulated with resorcinol and DSA in contact with an SCC layer formulated with HMF.
When the melt temp is exceeded the red color appears quickly as the components mix. Complete mixing of the component SCC formulations occurs only slowly, if at all, due to viscosity of the liquid SCC polymer.

An SCC layer formulated with resorcinol and DSA in contact with a paper substrate infused with HMF.

HMF was first dissolved in acetone and the HMF/acetone solution was then applied to the paper substrate. The HMF-treated paper was quite yellow in appearance.

Upon melting of the SCC layer at the SCC's melting temperature, the red response color appears quickly and spreads over the paper substrate.

An SCC layer formulated with resorcinol and HMF in contact with a paper substrate infused with DSA.

DSA was first dissolved in acetone and the HMF/acetone solution was then applied to the paper substrate.

Upon melting of the SCC layer at the SCC's melting temperature, the red response color appears quickly and spreads over the paper substrate.

Figure 19:
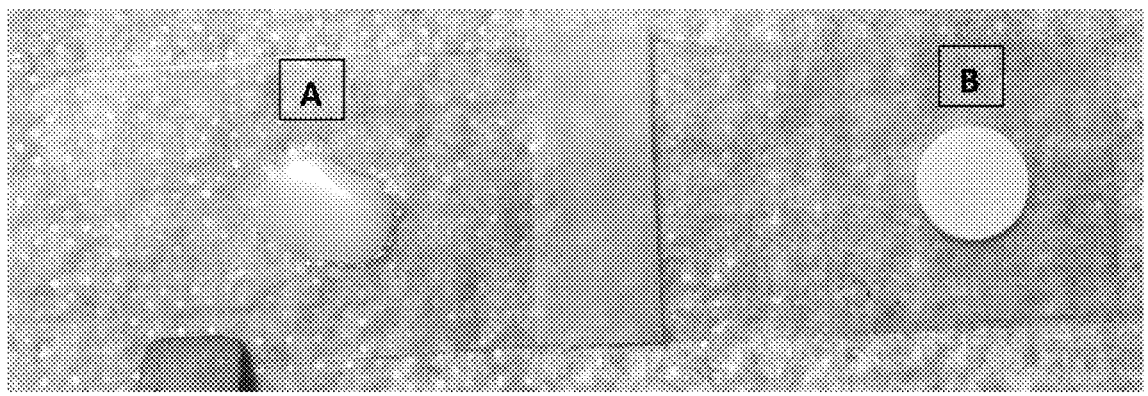
FIG. 19 illustrates another embodiment of two indicator components prior to being assembled as a threshold indicator.
Figure 20:
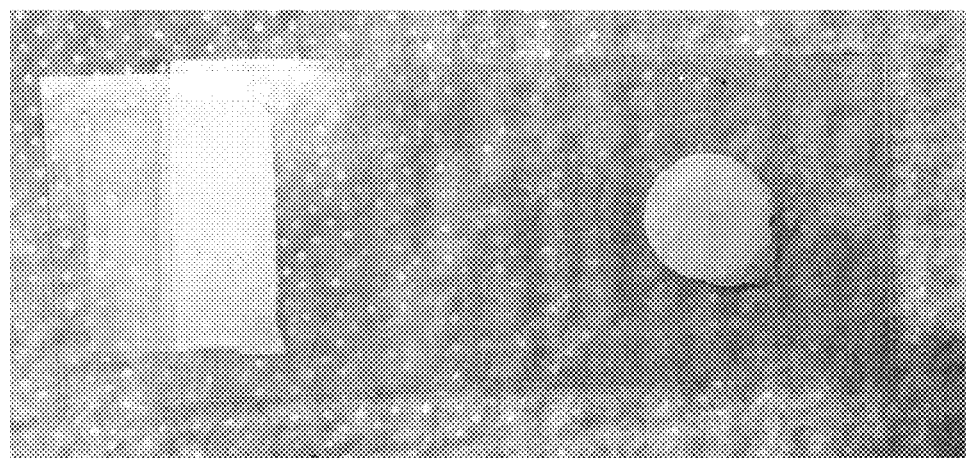
FIG. 20 illustrates the indicator components of FIG. 19 secured together in a sandwich configuration.

The DSA-infused substrate contacted by an SCC/resorcinol/HMF formulation was selected for fabrication and further testing. Each component formulation was affixed to separate, rectangular PET sections. The sections were joined by adhesive tape in a hinge-like manner so that the reactive components (A and B) could be placed face-to-face when the PET sections are brought together (FIG. 19). The assembly was brought together (i.e., activated) by pressing the "A" side over onto the "B" side (FIG. 20).

Figure 21:
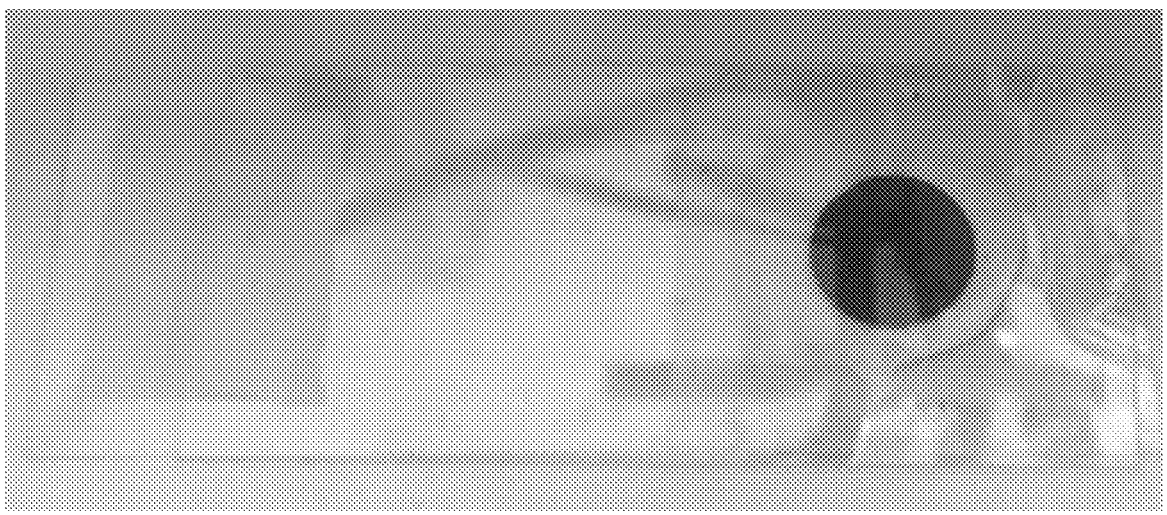
FIG. 21 illustrates the color change exhibited by the indicator of FIG. 20 when exposed to a temperature above a threshold temperature.

The activated indicator remained unchanged over a 16-hour period at 2° C. The activated indicator was then placed on a hotplate at >25° C. and the threshold temperature response observed as shown in FIG. 21.

EMBODIMENTS

The following specific embodiments are contemplated by the authors of the present disclosure, though it will be recognized by those skilled in the art that this list is not exhaustive of the embodiments that are consistent with the scope of this disclosure.

Embodiment 1

A delayed reaction threshold temperature indicator comprising:
a first substrate
a first layer further comprising a first reactant, the first layer positioned on top of the substrate;
a second layer further comprising a meltable polymer and a second reactant, the second layer positioned on top of the first layer;
a housing secured to the substrate, the housing including a viewing window through which the first and second layers are visible;
wherein exposure to a temperature at and/or above the melting point of the meltable polymer for a period of time allows the first reactant and/or second reactant to migrate toward each other; and
wherein the first and second reactants produce a visual change in appearance after they come into contact with each other.

Embodiment 2

The indicator of embodiments 1, wherein the visual change in appearance is a change in color.

Embodiment 3

The indicator of embodiment 2, wherein the change in color is a darkening of the first and second layers visible through the viewing window.

Embodiment 4

The indicator of embodiment 1, 2, or 3, wherein the first layer comprises a second substrate infused or impregnated with the first reactant.

Embodiment 5

The indicator of embodiment 1, 2, or 3, wherein the first layer comprises the meltable polymer with the first reactant initially contained therein.

Embodiment 6

The indicator of embodiment 1, 2, 3, 4, or 5, wherein the first or second substrate includes a background comprising a pattern, an indicia, or a color darker than an initial color of the first and second reactants prior to their contacting each other.

Embodiment 7

The indicator of embodiment 6, wherein the background is initially visible through the viewing window and is at least partially obscured by the visual change in appearance.

Embodiment 8

The indicator of embodiment 1, 2, 3, 4, 5, 6, or 7, wherein the melting point of the meltable polymer is from about −10° C. to about 50° C., from about −5° C. to about 40° C., from about 0° C. to about 30° C., from about 10° C. to about 25° C., or from about 15° C. to about 25° C.

Embodiment 9

The indicator of embodiment 1, 2, 3, 4, 5, 6, 7, or 8, wherein the melting point of the meltable polymer is about 0° C., about 5° C., about 10° C., about 15° C., about 20° C., about 25° C., or about 30° C.

Embodiment 10

The indicator of embodiment 1, 2, 3, 4, 5, 6, 7, 8, or 9, wherein the period of time is from about 5 minutes to about 60 minutes, from about 10 minutes to about 50 minutes, from about 15 minutes to about 40 minutes, or from about 20 minutes to about 30 minutes.

Embodiment 11

The indicator of embodiment 1, 2, 3, 4, 5, 6, 7, 8, 9, or 10, wherein the period of time is at least about 10 minutes, at least about 15 minutes, at least about 20 minutes, at least about 25 minutes, at least about 30 minutes, at least about 35 minutes, or at least about 40 minutes.

Embodiment 12

The indicator of embodiment 10 or 11, wherein the period of time occurs during a single exposure to a temperature at and/or above the melting point of the meltable polymer.

Embodiment 13

The indicator of embodiment 10 or 11, wherein the period of time occurs during two or more exposures to a temperature at and/or above the melting point of the meltable polymer.

Embodiment 14

The indicator of embodiment 1, 2, 3, 4, 5, 6, 7, 8, 9, 10, 11, 12, or 13, wherein the meltable polymer resolidifies rapidly when exposed to a temperature below the melting point of the meltable polymer.

Embodiment 15

The indicator of embodiment 14, wherein resolidification of the meltable polymer comprises recrystallization.

Embodiment 16

The indicator of embodiment 14 or 15, wherein the resolidification of the meltable polymer inhibits migration of the first and/or second reactants through the first and/or second layers.

Embodiment 17

The indicator of embodiment 1, 2, 3, 4, 5, 6, 7, 8, 9, 10, 11, 12, 13, 14, 15, or 16, wherein the molecular weight of the meltable polymer is from about 1,000 Da to about 400,000 Da, from about 2,000 Da to about 300,000 Da, from about 3,000 Da to about 200,000 Da, from about 5,000 Da to about 30,000 Da, or from about 8,000 Da to about 24,000 Da.

Embodiment 18

The indicator of embodiment 1, 2, 3, 4, 5, 6, 7, 8, 9, 10, 11, 12, 13, 14, 15, 16, or 17, wherein the first reactant is bromothymol blue or resorcinol.

Embodiment 19

The indicator of embodiment 1, 2, 3, 4, 5, 6, 7, 8, 9, 10, 11, 12, 13, 14, 15, 16, 17, or 18, wherein the weight percent of the first reactant in the first layer is about 0.1% to about 10%, about 0.2% to about 5%, about 0.5% to about 3%, or about 1% to about 2%.

Embodiment 20

The indicator of embodiment 1, 2, 3, 4, 5, 6, 7, 8, 9, 10, 11, 12, 13, 14, 15, 16, 17, or 18, wherein the weight percent of the first reactant in the first layer is about 0.5%, about 0.7%, about 1%, about 1.2%, about 1.5%, about 2%, about 3%, or about 4%.

Embodiment 21

The indicator of embodiment 1, 2, 3, 4, 5, 6, 7, 8, 9, 10, 11, 12, 13, 14, 15, 16, 17, 18, 19, or 20, wherein the second reactant is butylamine or 5-(hydroxymethyl)furfural (HMF).

Embodiment 22

The indicator of embodiment 1, 2, 3, 4, 5, 6, 7, 8, 9, 10, 11, 12, 13, 14, 15, 16, 17, 18, 19, 20, or 21, wherein the weight percent of the second reactant in the second layer is about 0.5% to about 20%, about 1% to about 15%, about 1.5% to about 10%, or about 2% to about 5%.

Embodiment 23

The indicator of embodiment 1, 2, 3, 4, 5, 6, 7, 8, 9, 10, 11, 12, 13, 14, 15, 16, 17, 18, 19, 20, or 21, wherein the weight percent of the second reactant in the second layer is about 1%, about 1.5%, about 2%, about 2.5%, about 3%, about 3.5%, about 4%, about 4.5%, about 5%, or about 5.5%.

Embodiment 24

The indicator of embodiment 1, 2, 3, 4, 5, 6, 7, 8, 9, 10, 11, 12, 13, 14, 15, 16, 17, 18, 19, 20, 21, 22, or 23, wherein the first and/or second layer include an additive or catalyst configured to affect the reaction between the first and second reactants.

Embodiment 25

The indicator of embodiment 1, 2, 3, 4, 5, 6, 7, 8, 9, 10, 11, 12, 13, 14, 15, 16, 17, 18, 19, 20, 21, 22, 23, or 24, wherein the amount of the second reactant exceeds the amount of the first reactant on a molar basis.

Embodiment 26

The indicator of embodiment 1, 2, 3, 4, 5, 6, 7, 8, 9, 10, 11, 12, 13, 14, 15, 16, 17, 18, 19, 20, 21, 22, 23, or 24, wherein the amount of the second reactant is sufficient to react with substantially all of the first reactant.

Embodiment 27

The indicator of embodiment 1, 2, 3, 4, 5, 6, 7, 8, 9, 10, 11, 12, 13, 14, 15, 16, 17, 18, 19, 20, 21, 22, 23, 24, or 25, wherein the amount of the second reactant is sufficient to react with at least about 60%, at least about 70%, at least about 80%, at least about 90%, or at least about 95% of the first reactant.

Embodiment 28

The indicator of embodiment 1, 2, 3, 4, 5, 6, 7, 8, 9, 10, 11, 12, 13, 14, 15, 16, 17, 18, 19, 20, 21, 22, 23, 24, 25, 26, or 27, wherein the weight ratio of the first reactant to the second reactant is at least about 1:1, at least about 1:1.2, at least about 1:1.4, at least about 1:1.5, at least about 1:1.6, at least about 1:1.8, or at least about 1:2.

Embodiment 29

The indicator of embodiment 1, 2, 3, 4, 5, 6, 7, 8, 9, 10, 11, 12, 13, 14, 15, 16, 17, 18, 19, 20, 21, 22, 23, 24, 25, 26, 27, or 28, further comprising a barrier layer between the first and second layers.

Embodiment 30

The indicator of embodiment 29, wherein the barrier layer is permeable to at least one of the meltable polymer, the first reactant, and the second reactant when the meltable polymer is at least partially liquid or at least partially amorphous.

Embodiment 31

The indicator of embodiment 29 or 30, wherein the barrier layer comprises a meltable material.

Embodiment 32

The indicator of embodiment 31, wherein the meltable material comprises the meltable polymer.

Embodiment 33

The indicator of embodiment 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32, further comprising a reference area surrounding or adjacent to the viewing window.

Embodiment 34

The indicator of embodiment 33, wherein the reference area comprises a pattern, a color, or a printed indicia that contrasts with or corresponds to the visual change in appearance caused by the reaction between the first and second reactants.

Embodiment 35

A combination indicator comprising;
the indicator of embodiment 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, or 34; and
at least one of a freeze indicator, a second threshold indicator, and a cumulative indicator.

Embodiment 36

The combination indicator of claim 35, wherein the threshold indicator and/or the cumulative indicator is configured to monitor at least one of a change in or a period of exposure to temperature, pH, humidity, or radiation.

Embodiment 37

The indicator of embodiment 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, or 34 or the combination indicator of embodiment 32 or 33 affixed to a product, a container, or a product packaging.

Embodiment 38

The indicator or combination indicator of embodiment 37, wherein the product, container, or product packaging contains a perishable substance.

Embodiment 39

The indicator or combination indicator of embodiment 38, wherein the perishable substance is a food product or a pharmaceutical product, such as a vaccine or a medicine.

Embodiment 40

A method of activating the indicator of embodiment 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30, the method comprising:
applying the first layer to a first face of the first substrate so that the first layer is adhered to the first substrate;
applying the second layer to a first face of the housing so that the second layer is adhered to the housing; and
affixing the housing to the first substrate so as to bring the first layer into contact with the second layer.

Embodiment 41

A method of activating the indicator of embodiment 31, 32, 33, or 34, the method comprising:
applying the first layer to a first face of the first substrate so that the first layer is adhered to the first substrate;
applying the barrier layer to the first layer;
applying the second layer to a first face of the housing so that the second layer is adhered to the housing; and
affixing the housing to the first substrate so as to bring the first layer into contact with the barrier layer.

Embodiment 42

The method of embodiment 41, further comprising removing the optional barrier layer after affixing the housing to the first substrate so as to allow the first meltable polymer layer to come into contact with the second meltable polymer layer.

Embodiment 43

The method of embodiment 42, further comprising applying pressure to the housing so as to bring the second meltable polymer layer into contact with the first meltable polymer layer.

Embodiment 44

A method of making a delayed reaction threshold temperature indicator, the method comprising:
applying a first mixture to a first substrate to create a first indicator element, the first mixture comprising a first reactant;
applying a second mixture to a second substrate to create a second indicator element, the second mixture comprising a meltable polymer and a second reactant; and
securing the first and second indicator elements to each other so that at least part of the second mixture is brought into contact with the first mixture and so that first and second mixtures are enclosed by the first and second substrates;

wherein melting of the meltable polymer allows the first and second reactants to contact each other to produce a visual change in appearance.

Embodiment 45

The method of embodiment 44, wherein the first mixture further comprises a meltable polymer.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. In one embodiment, the terms "about" and "approximately" refer to numerical parameters within 10% of the indicated range.

The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventor for carrying out the embodiments of the present disclosure. Of course, variations on these described embodiments will become apparent to those of ordinary skill in the art upon reading the foregoing description. The inventor expects skilled artisans to employ such variations as appropriate, and the inventor intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Furthermore, if any references have been made to patents and printed publications throughout this disclosure, each of these references and printed publications are individually incorporated herein by reference in their entirety.

In closing, it is to be understood that the embodiments disclosed herein are illustrative of the principles of the present disclosure. Other modifications that may be employed are within the scope of this disclosure. Thus, by way of example, but not of limitation, alternative configurations of the embodiments of the present disclosure may be utilized in accordance with the teachings herein. Accordingly, the present disclosure is not limited to that precisely as shown and described.

The invention claimed is:

1. A delayed reaction threshold temperature indicator with a predetermined exposure time threshold comprising:
    a first substrate
    a first layer further comprising a first reactant, the first layer positioned on top of the substrate;
    a second layer further comprising a meltable polymer and a second reactant, the second layer positioned on top of the first layer;
    a housing secured to the substrate, the housing including a viewing window through which the first and second layers are visible;
    wherein exposure to a temperature at and/or above the melting point of the meltable polymer allows the first reactant and/or second reactant to migrate toward each other;
    wherein, when exposed to a temperature at the melting point of the meltable polymer, the first and second reactants require at least a period of exposure time to the temperature at the melting point that is greater than the predetermined exposure time threshold in order to migrate into contact with each other;
    wherein the first and second reactants produce a visual change in appearance after they come into contact with each other, even if the temperature returns to below the melting point of the meltable polymer after they come into contact.

2. The indicator of claim 1, wherein the first substrate includes a background comprising a pattern, an indicia, or a color darker than an initial color of the first and second reactants prior to their contacting each other.

3. The indicator of claim 1 wherein the predetermined exposure time threshold is at least 5 minutes and less than or equal to 60 minutes.

4. The indicator of claim 1, wherein the meltable polymer resolidifies rapidly when exposed to a temperature below the melting point of the meltable polymer, thereby inhibiting the migration of the first and/or second reactants through the first and/or second layers, and preventing the visual change of appearance if the first and second reactants have not yet contacted each other.

5. The indicator of claim 1, wherein the first reactant is bromothymol blue or resorcinol.

6. The indicator of claim 1, wherein the second reactant is butylamine or 5-(hydroxymethyl)furfural (HMF).

7. The indicator of claim 1, wherein the first and/or second layer include an additive or catalyst configured to affect the reaction between the first and second reactants.

8. The indicator of claim 1, further comprising a reference area surrounding or adjacent to the viewing window.

9. A method of activating the indicator of claim 1, the method comprising:
   applying the first layer to a first face of the first substrate so that the first layer is adhered to the first substrate;
   applying the second layer to a first face of the housing so that the second layer is adhered to the housing; and
   affixing the housing to the first substrate so as to bring the first layer into contact with the second layer.

10. The indicator of claim 1, wherein the predetermined exposure time threshold is at least 10 minutes.

11. The indicator of claim 1, wherein the predetermined exposure time threshold is at least about 30 minutes.

12. The indicator of claim 1, wherein the visual change in appearance is a change in color.

13. The indicator of claim 12, wherein the change in color is a darkening of the first and second layers visible through the viewing window.

14. A combination indicator comprising;
   the indicator of claim 1, and
   at least one of a freeze indicator, a second temperature threshold exposure indicator, and a cumulative heat exposure indicator.

15. The combination indicator of claim 14, wherein the second threshold indicator and/or the cumulative indicator is configured to monitor at least one of a change in or a period of exposure to temperature, pH, humidity, or radiation.

16. The indicator of claim 1, affixed to a product, a container, or a product packaging.

17. The indicator or combination indicator of claim 16, wherein the product, container, or product packaging contains a perishable substance.

18. The indicator of claim 1, further comprising a barrier layer between the first and second layers.

19. The indicator of claim 18, wherein the barrier layer is permeable to at least one of the meltable polymer, the first reactant, and the second reactant when the meltable polymer is at least partially liquid or at least partially amorphous.

20. The indicator of claim 18, wherein the barrier layer comprises a meltable material.

21. The indicator of claim 20, wherein the meltable material comprises the meltable polymer.

22. A method of activating the indicator of claim 20, the method comprising:
   applying the first layer to a first face of the first substrate so that the first layer is adhered to the first substrate;
   applying the barrier layer to the first layer;
   applying the second layer to a first face of the housing so that the second layer is adhered to the housing; and
   affixing the housing to the first substrate so as to bring the first layer into contact with the barrier layer.

23. A method of making a delayed reaction threshold temperature indicator, the method comprising:
   applying a first mixture to a first substrate to create a first indicator element, the first mixture comprising a first reactant;
   applying a second mixture to a second substrate to create a second indicator element, the second mixture comprising a meltable polymer and a second reactant; and
   securing the first and second indicator elements to each other so that at least part of the second mixture is brought into contact with the first mixture and so that first and second mixtures are enclosed by the first and second substrates;
   wherein melting of the meltable polymer allows the first and second reactants to migrate into contact each other only after the indicator has been exposed to a temperature above at or above a predetermined temperature threshold for at least a predetermined time period, to produce a visual change in appearance.

* * * * *